(12) United States Patent
Cohen et al.

(10) Patent No.: US 10,585,613 B2
(45) Date of Patent: Mar. 10, 2020

(54) SMALL STORAGE VOLUME MANAGEMENT

(71) Applicant: INTERNATIONAL BUSINESS MACHINES CORPORATION, Armonk, NY (US)

(72) Inventors: Dan Cohen, Nataf (IL); Rivka M. Matosevich, Zichron-Ya'acov (IL); Ovad Somech, Rishon LeZion (IL); Eran Tzabari, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/834,503

(22) Filed: Dec. 7, 2017

(65) Prior Publication Data
US 2018/0095694 A1 Apr. 5, 2018

Related U.S. Application Data

(63) Continuation of application No. 15/082,077, filed on Mar. 28, 2016, now Pat. No. 9,898,223.

(51) Int. Cl.
*G06F 3/06* (2006.01)
*G06F 11/14* (2006.01)

(52) U.S. Cl.
CPC .......... *G06F 3/0644* (2013.01); *G06F 3/0608* (2013.01); *G06F 3/0619* (2013.01); *G06F 3/0631* (2013.01); *G06F 3/0673* (2013.01); *G06F 3/0689* (2013.01); *G06F 11/1446* (2013.01); *G06F 2201/84* (2013.01)

(58) Field of Classification Search
CPC .... G06F 3/0644; G06F 3/0608; G06F 3/0631; G06F 3/0673
See application file for complete search history.

(56) References Cited

U.S. PATENT DOCUMENTS

| 7,293,154 | B1 | 11/2007 | Karr et al. | |
| 7,409,494 | B2 | 8/2008 | Edwards et al. | |
| 7,552,146 | B1 | 6/2009 | Kahn et al. | |
| 9,898,223 | B2* | 2/2018 | Cohen | G06F 3/0644 |
| 2006/0242382 | A1* | 10/2006 | Griess | G06F 3/0608 |
| | | | | 711/170 |

(Continued)

OTHER PUBLICATIONS

Hernandez, Pedro, "A Guide to Block Storage", May 7, 2018, available at https://www.enterprisestorageforum.com/storage-technology/a-guide-to-block-storage.html (Year: 2018).*

(Continued)

*Primary Examiner* — Edward J Dudek, Jr.
(74) *Attorney, Agent, or Firm* — ZIP Group PLLC

(57) ABSTRACT

An aggregation volume includes a plurality of sub-volumes. Advanced storage functions or operations are carried out at the aggregation volume granularity and therefore are carried out on all sub-volumes allocated in a single aggregation volume at the same time. Such organization results in a de facto consistency group for all sub-volumes associated with a single aggregation volume. To create a sub-volume the aggregation volume is logically divided into pre-defined size chunks. Each chuck can subsequently be allocated to the sub-volume. When a sub-volume is created it is allocated to a number of chunks according to a requested sub-volume size.

20 Claims, 18 Drawing Sheets

(56) References Cited

U.S. PATENT DOCUMENTS

| | | |
|---|---|---|
| 2014/0201150 A1 | 7/2014 | Kumarasamy et al. |
| 2016/0011786 A1* | 1/2016 | Ninose ................ G06F 12/0246 711/103 |
| 2016/0117115 A1* | 4/2016 | Mehra ................... G06F 3/0631 711/112 |

OTHER PUBLICATIONS

Block Storage by Technopedia, Jul. 3, 2016, available at https://www.techopedia.com/definition/31924/block-storage (Year: 2016).*
Yosha, Nir, "Forward! with NetApp SAP ERP and Oracle NVA Design," NVA-0013-DESIGN, v.1.0, NetApp, Inc., Oct. 2014.
List of IBM Patents or Patent Applications Treated as Related, dated herewith.

* cited by examiner

SMALL STORAGE VOLUME MANAGEMENT

FIELD OF THE INVENTION

Embodiments of the invention generally relate to computer systems and more particularly to the management of numerous small storage volumes or blocks in storage systems.

DESCRIPTION OF THE RELATED ART

Traditionally, block storage systems, herein referred to as storage systems, have had a problem in efficiently supporting a large number of relatively small sized volumes. In recent years, new use cases, such as virtual volumes (vVOL), make the efficient utilization of a large number of small volumes more relevant than ever.

Storage systems have traditionally inefficiently managed numerous small volumes because small volumes lead to storage capacity over-subscription, because it is complex to scale storage system functionality to each of the numerous small volumes, and because of it is complex to implement consistency groups of the numerous small volumes.

Storage capacity over-subscriptions are seen in storage systems where the physical storage space is allocated on a data write (as opposed to when the volume is created) and in storage systems where the data is spread by an algorithm that guarantees that committed space is available when the write is received. This need to guarantee storage space availability leads to rounding up of the volume soft space to the nearest full soft allocation unit. This means that on average, each volume has about a 0.5 soft allocation unit overhead. When the ratio between the volume size and the soft allocation unit size is large the overhead is negligible, but when the volumes are small relatively to the soft allocation unit the overhead become significant. For example, in a particular storage system, the soft allocation unit size is 17 gigabytes. Creation of a volume of 1 gigabyte will cause the storage system to the consume 1700% of the actual required space. The problem is especially prevalent in storage systems where the majority of the volumes have an average size smaller than 4 gigabytes.

When a storage system includes numerous small volumes, scalability of storage system functionality is often limited. Modern, high end storage systems provide a rich set of volume related storage features such as mirroring, consistency groups, snapshots, etc. Due to complexities in carrying out those functions upon the numerous small volumes, the scalability of those features is often limited. For example, a particular storage solution may support 1,500 mirror relationships, 512 consistency groups, and volume snapshot functions wherein each snapshot taken is reduced from the total available volumes in the system. Traditionally, if a large number of volumes are supported, only a fraction of those volumes can participate in the advanced storage features.

Similarly, when a storage system includes numerous small volumes, implementation of consistency groups is complex. A particular storage system may provide the ability to define consistency groups of storage volumes in order to carry out a storage operation such as snapshot on a set or group of volumes, while guaranteeing the consistency of the result. The number of consistency groups that can be defined in a storage system is typically limited. Furthermore, the consistency group may be used as a synchronization mechanism whereby the products of the synchronized storage operation are counted per volume in the consistency group. For example a snapshot on a consistency group with 10 volumes will create 10 distinct snapshots, a mirror of a consistency group with 10 volumes will consume 10 mirror relationships from the system, etc. If a large number of volumes are supported, only a fraction of those volumes can participate in consistency group operations.

SUMMARY

In an embodiment of the present invention, a method for managing small storage volumes in a storage system is presented. The method includes creating an aggregation volume in a storage device within the storage system. The method includes partitioning the aggregation volume into a plurality of equally sized chunks. The method includes receiving a request at the storage system to create a sub-volume. The request includes a requested sub-volume size. The method includes creating a sub-volume by allocating a number of chunks most similar to the requested sub-volume size as the sub-volume. The method further includes storing a sub-volume segment data structure within a sub-volume segment container within the storage system. The sub-volume segment data structure includes a segment entry of the sub-volume. The segment entry includes a size value that indicates the number of chunks of the aggregation volume that were allocated to the sub-volume and an offset value that indicates the number of chunks between the aggregation volume beginning to the sub-volume beginning.

In an embodiment of the present invention, a computer program product for managing small storage volumes in a storage system. The computer program product includes a computer readable storage medium having program instructions embodied therewith. The program instructions are readable by the storage system to cause the storage system to create an aggregation volume in a storage device within the storage system and to partition the aggregation volume into a plurality of equally sized chunks. The program instructions are readable by the storage system to cause the storage system to receive a request to create a sub-volume, the request comprising a requested sub-volume size and create a sub-volume by allocating a number of chunks most similar to the requested sub-volume size as the sub-volume. The program instructions are further readable by the storage system to cause the storage system to store a sub-volume segment data structure within a sub-volume segment container within the storage system. The sub-volume segment data structure includes a segment entry of the sub-volume. The segment entry includes a size value that indicates the number of chunks of the aggregation volume that were allocated to the sub-volume and an offset value that indicates the number of chunks between the aggregation volume beginning to the sub-volume beginning.

In another embodiment of the present invention, a storage system is presented. The storage system includes a plurality of storage devices and a storage controller between a computer and the plurality of storage devices. The storage controller manages storage operations of data to and from the plurality of storage devices and manages small storage volumes in the storage system. The storage controller includes program instructions which are readable by the storage system to cause the storage system to create an aggregation volume in a storage device within the storage system, partition the aggregation volume into a plurality of equally sized chunks, and to receive a request to create a sub-volume. The request includes a requested sub-volume size. The storage controller includes program instructions which are readable by the storage system to cause the storage system to create a sub-volume by allocating a number of chunks most similar to the requested sub-volume size as the sub-volume and store a sub-volume segment data structure within a sub-volume segment container within the storage system. The sub-volume segment data structure includes a segment entry of the sub-volume. The segment entry includes a size value that indicates the number of chunks of the aggregation volume that were allocated to the sub-volume and an offset value that indicates the number of chunks between the aggregation volume beginning to the sub-volume beginning.

These and other embodiments, features, aspects, and advantages will become better understood with reference to the following description, appended claims, and accompanying drawings.

DETAILED DESCRIPTION

Figure 1:
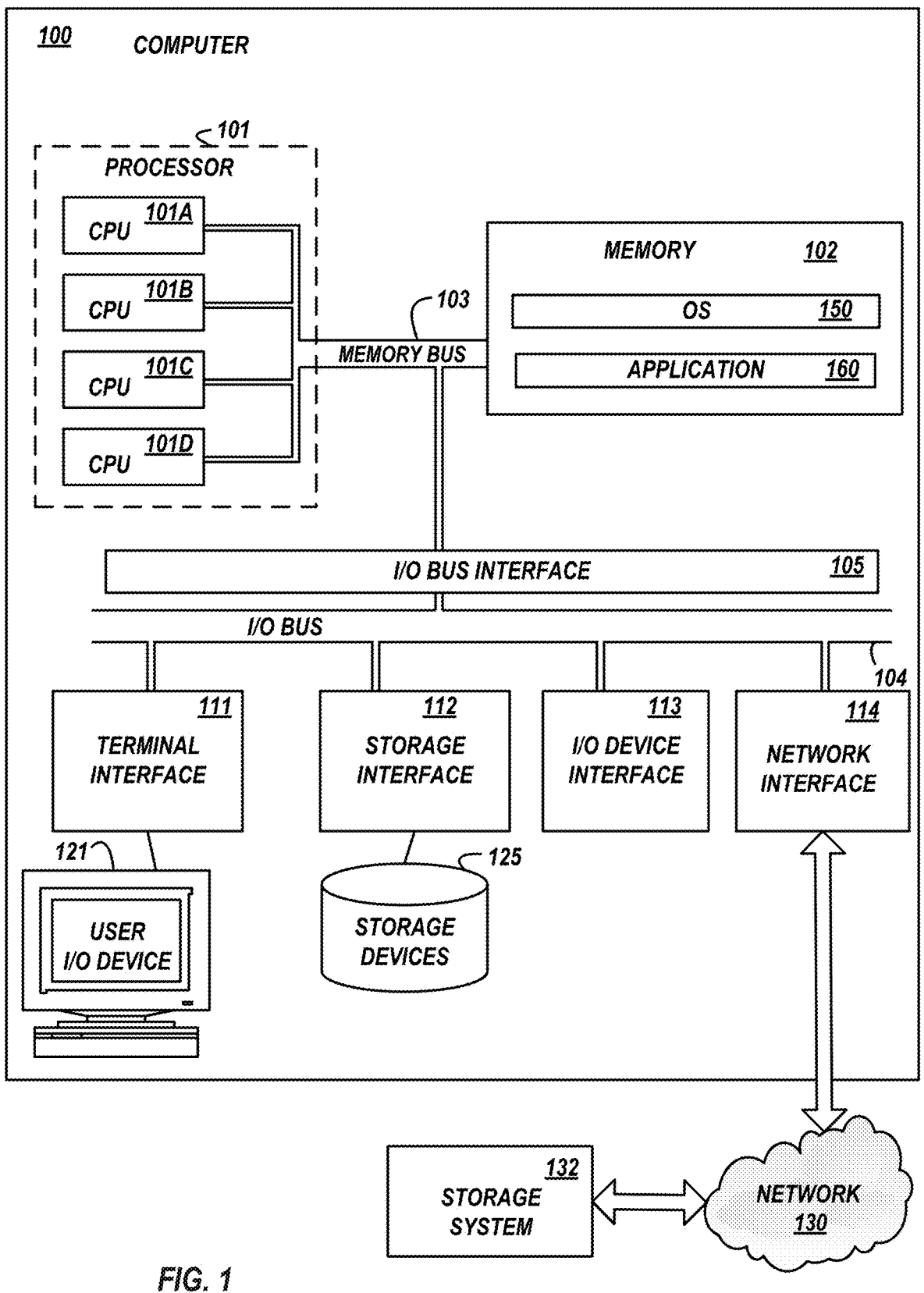
FIG. 1 illustrates a high-level block diagram of an exemplary data handling system, such as a computer, for implementing various embodiments of the invention.

In a block storage system, a sub-volume is a predefined manageable part of an aggregation volume. The aggregation volume is a particular type of volume, as is further described herein. A volume, also referred to as a block in the art, is a sequence of bytes or bits, usually containing some whole number of records, having a maximum length referred to as a block size. The process of putting data into blocks is called blocking, while deblocking is the process of extracting data from blocks. Blocked data is traditionally stored in a data buffer of a storage device and read or written a whole block at a time. Blocks may be accessed by block I/O whereby an operating system or application sends blocks to the storage device to be written or asking for blocks using a logical block address (LBA).

Generally, the aggregation volume includes a plurality of sub-volumes. Advanced storage functions or operations are carried out at an aggregation volume granularity and therefore are carried out on all sub-volumes allocated in a single aggregation volume at the same time. Such organization results in a de facto consistency group for all sub-volumes associated with a single aggregation volume. However, each sub-volume may be read or written to and at a sub-volume granularity.

A particular arrangement of multiple sub-volumes into an aggregation volume having no slack space (i.e., the block size of the total of sub-volumes equals the block size of the aggregation volume) forms a static consistency group. Such arrangement increases the scalability of consistency groups in the storage system since each such static consistency group is a single volume upon which storage operations operate.

Since the multiple sub-volumes are managed parts of the aggregation volume, they can be regarded internally as aggregation volume metadata and therefore there is no need for over subscription for each sub-volume.

In one possible implementation, sub-volume support will be enabled by a volume management application called by a storage controller within the storage system. Each sub-volume will be contained in an aggregation volume that which could contain several sub-volumes. The aggregation volume will be logically divided into pre-defined size chunks. Each chuck can subsequently be allocated to a sub-volume. When a sub-volume is created it is assigned to a number of chunks according to a requested sub-volume size.

The storage system also includes at least a sub-volume meta-data container and a sub-volume segment container. The sub-volume meta-data container stores data structures that have sub-volume metadata information and enables the storage system to access each individual sub-volume at a sub-volume granularity. The sub-volume segment container contains data structures that identify the chunks allocated to each sub-volume.

A snapshot is an exemplary advanced storage function or operation that is carried out at an aggregation volume granularity. Snapshots are created at the aggregation volume level. The storage system saves associated sub-volume metadata at the time of the snapshot in order to provide full snapshot functionality to each sub-volume snapshot and in order to save associated sub-volume configuration at the time of the snapshot.

In a snapshot operation, the aggregation volume is snapped like a traditional block as is known in the art. Meta-data is generated that identifies the snapshot as being of an aggregation volume. The storage system creates a sub-volume snapshot data structure in a sub-volume snapshot container. The sub-volume snapshot data structure may point to an existing sub-volume meta-data data structure located in the sub-volume meta-data container and to an associated sub-volume snapshot portion within the newly created snapshot. The size of the sub-volume snapshot portion is determined from the sub-volume entry. The sub-volume size is entered in the sub-volume snapshot entry to enable the storage system to properly restore the sub-volume snapshot portion in the event of the sub-volume size changing.

Referring to the Drawings, wherein like numbers denote like parts throughout the several views, FIG. 1 depicts a high-level block diagram representation of a computer 100 connected to a storage system 132 via a network 130. The term "computer" is used herein for convenience only, and in various embodiments, is a more general data handling system. The mechanisms and apparatus of embodiments of the present invention apply equally to any appropriate data handling system.

The major components of the computer 100 may comprise one or more processors 101, a main memory 102, a terminal interface 111, a storage interface 112, an I/O (Input/Output) device interface 113, and a network interface 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, an application 160, etc. are illustrated as being contained within the memory 102 in the computer 100, in other embodiments some or all of them may be on different computer systems and may be accessed remotely, e.g., via a network. The computer 100 may use virtual addressing mechanisms that allow the programs of the computer 100 to behave as if they only have access to a large, single storage entity instead of access to multiple, smaller storage entities.

Thus, while operating system 150, application 160, or other program instructions are illustrated as being contained within the main memory 102, these elements are not necessarily all completely contained in the same memory at the same time. Further, although operating system 150, an application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGs.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more local disk drives or one or more storage devices 125. In an embodiment, the storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the storage device 125, as needed. The local storage devices 125 have a slower access time than does the memory 102, meaning that the time needed to read and/or write data from/to the memory 102 is less than the time needed to read and/or write data from/to for the local storage devices 125.

The I/O device interface unit 113 provides an interface to any of various other input/output devices or devices of other types, such as printers or fax machines. The network interface unit 114 provides one or more communications paths from the computer 100 to other data handling devices such as storage system 132; such paths may comprise, e.g., one or more networks 130. Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface unit 113 and/or network interface 114 may contain electronic components and logic to adapt or convert data of one protocol on I/O bus 104 to another protocol on another bus. Therefore, I/O interface unit 113 and/or network interface 114 may connect a wide variety of devices to computer 100 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a storage server, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

A communication network may connect the computer 100 to another data handling device and be any suitable communication network or combination of networks and may support any appropriate protocol suitable for communication of data and/or code to/from the computer 100. In various embodiments, the communication network may represent a data handling device or a combination of data handling devices, either connected directly or indirectly to the computer 100. In another embodiment, the communication network may support wireless communications. In another embodiment, the communication network may support hard-wired communications, such as a telephone line or cable. In another embodiment, the communication network may be the Internet and may support IP (Internet Protocol). In another embodiment, the communication network is implemented as a local area network (LAN) or a wide area network (WAN). In another embodiment, the communication network is implemented as a hotspot service provider network. In another embodiment, the communication network is implemented an intranet. In another embodiment, the communication network is implemented as any appropriate cellular data network, cell-based radio network technology, or wireless network. In another embodiment, the communication network is implemented as any suitable network or combination of networks.

Network 130 which connects computer 100 and storage device 132 is a storage area network (SAN), which is a network which provides access to consolidated, block level data storage. Network 130 is generally any high-performance network whose primary purpose is to enable storage system 132 to provide block level storage operations to computer 100. Network 130 may be primarily used to enhance storage devices, such as disk arrays, tape libraries, optical jukeboxes, etc., within the storage system 132 to be accessible to computer 100 so that the devices appear to the operating system 150 as locally attached devices. In other words, the storage system 132 may appear to the OS 150 as being storage device 125. A benefit of network 130 is that raw storage is treated as a pool of resources that can be centrally managed and allocated on an as-needed basis. Further, network 130 may be highly scalable because additional storage capacity can be added as required.

Network 130 may include may include multiple storage systems 132. Application 160 and/or OS 150 of multiple computers 100 can be connected to multiple storage systems 132 via the network 130. For example, any application 160 and or OS 150 running on each computer 100 can access shared or distinct block level storage within storage system 132. When computer 100 wants to access a storage device within storage system 132 via the network 130, computer 100 sends out a block-based access request for the storage device. Network 130 may further include cabling, host bus adapters (HBAs), and switches. Each switch and storage system 132 on the network 130 may be interconnected and the interconnections generally support bandwidth levels that can adequately handle peak data activities. Network 130 may be a Fibre Channel SAN, iSCSI SAN, or the like.

In an embodiment, the storage system 132 may comprise some or all of the elements of the computer 100 and/or additional elements not included in computer 100.

FIG. 1 is intended to depict representative major components of the computer 100. Individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
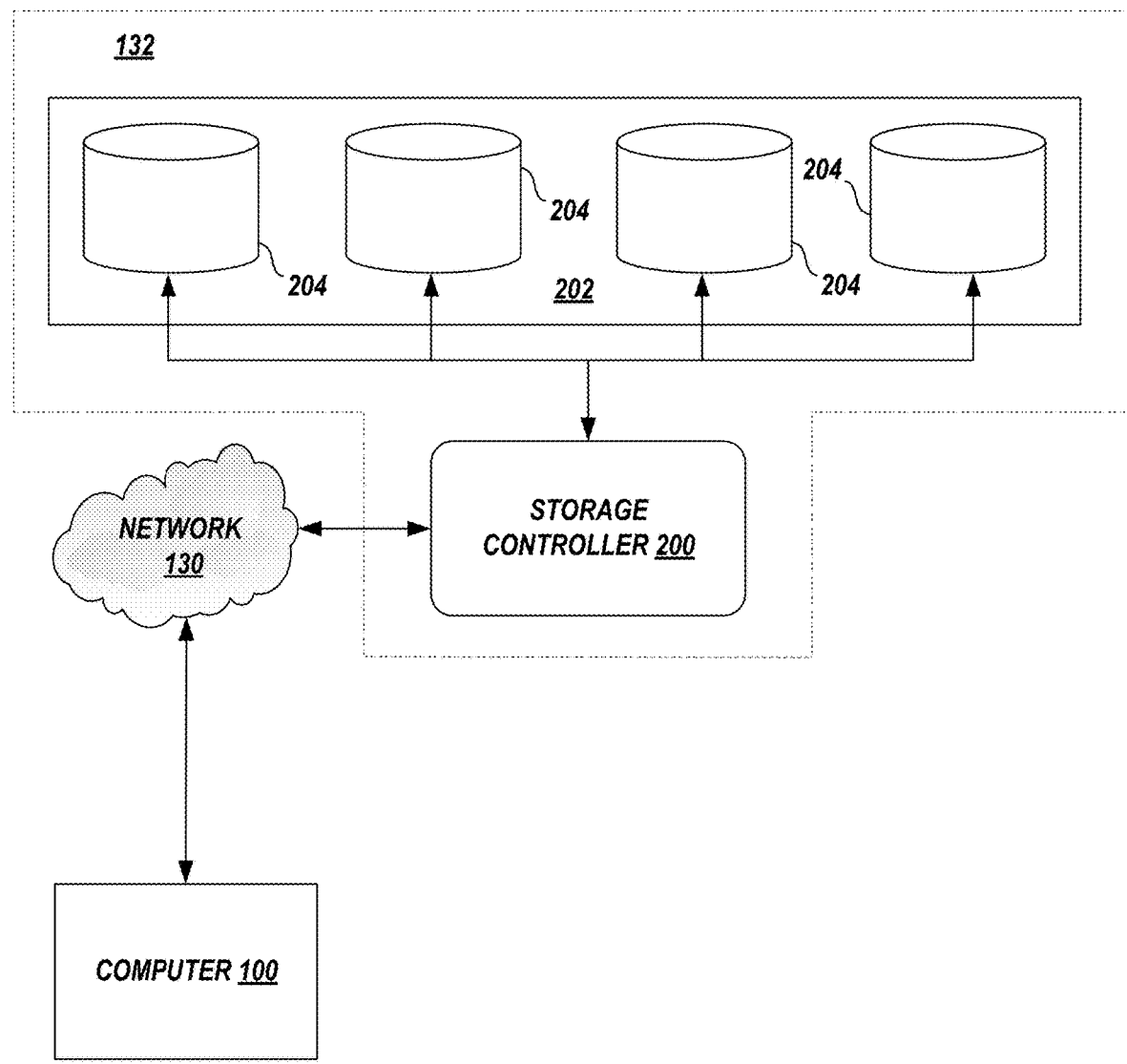
FIG. 2 illustrates an exemplary storage system for implementing various embodiments of the invention.

Referring to FIG. 2 that illustrates an exemplary storage system 132 which includes a storage controller 200 and storage devices 204. Storage controller 200 is a device that is logically located between computer 100 and storage devices 204, presenting itself to computer 100 as a storage provider (target) and presenting itself to storage devices 204 as one big host (initiator). Controller 200 is communicatively attached to one or several networks 130.

In certain embodiments, the storage controller 200 may comprise some or all of the elements of the computer 100. For example, storage controller 200 may be a controlling node within a multi-node storage system 132. The controlling node is a specific data handling device, such as a server, blade, etc. which may include some or all of the elements of the computer 100. In other embodiments, storage controller 200 may be a device e.g. processor 101, application specific integrated circuit (ASIC), or the like that is connected to storage devices 204 via e.g., memory bus 103, I/O bus 104, etc. of storage system 132.

Storage device 204 is a device for storing data. Specific examples of a storage device 204 may be a magnetic storage device, optical storage device, or an electrical storage device. A magnetic storage device may be a magnetic tape device, drum memory device, floppy disk drive, etc. An optical storage device may be an optical jukebox, optical disk, disk drive, etc. An electrical storage device may be a semiconductor device used in volatile random-access memory, flash memory device, solid state storage device, etc.

When storage devices 204 and storage controller 200 are located in the same enclosure, storage devices 204 may be communicatively connected to the storage controller 200 via a memory bus 103, I/O bus 104, etc. of storage system 132. Alternatively, when storage controller 200 is a controlling node within a multi-node storage system 132, storage devices 204 may be located in a storage node of the multi-node storage system 132. The storage node is a specific data handling device, such as a server, blade, etc. which may include some or all of the elements of the computer 100 and storage devices 204. A particular storage system 132 may include a single controlling node and multiple storage nodes and each node is communicatively connected to all other nodes. In embodiments, multiple storage devices 204 may be included within a storage array 202 within storage system 132, such as a RAID array, or the like. The array 202 is essentially multiple devices 204 that enables the distribution of data across the multiple devices 204, provides fault tolerance through redundant devices 204, as is known in the art.

Figure 3:
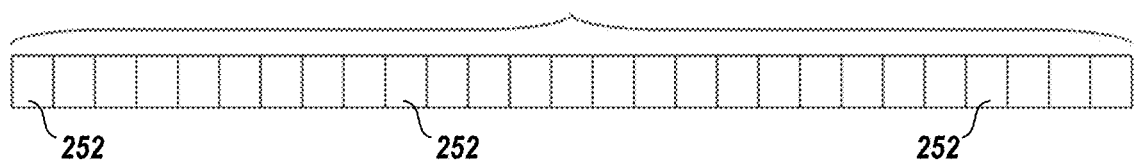
FIG. 3 illustrates an exemplary aggregation volume that stores data within a storage system, according to various embodiments of the present invention.

FIG. 3 illustrates an exemplary aggregation volume 250 stored within a data buffer of a storage device 204 within storage system 132. The aggregation volume 250 is a sequence of data bytes or bits, usually containing some whole number of records, having a predetermined length referred to as a maximum aggregation volume size. Aggregation volume 250 data is stored in a data buffer of a storage device 204. Aggregation volume 250 may be accessed by block I/O whereby operating system 150 or application 160 sends an entire aggregation volume 250 to the storage device to be written or asking for the entire aggregation volume 250.

Figure 4:
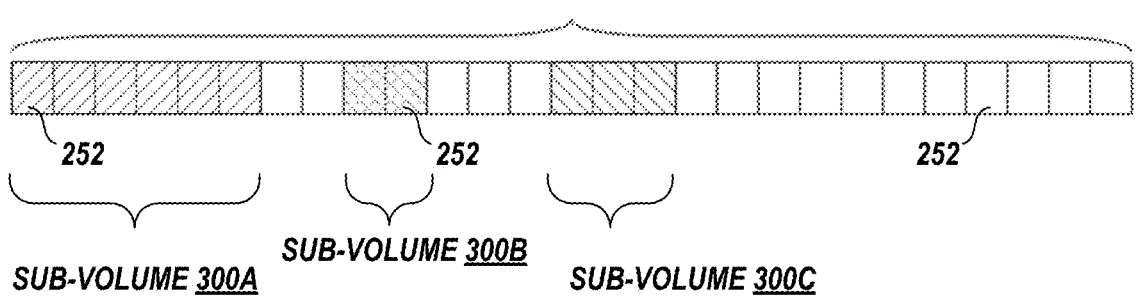
FIG. 4 illustrates an exemplary aggregation volume which includes multiple sub-volumes that each store data within a storage system, according to various embodiments of the present invention.

Generally, the aggregation volume 250 includes a plurality of sub-volumes 300, as is exemplarily shown in FIG. 4. Advanced storage functions or operations are generally carried out at an aggregation volume 250 granularity and therefore are carried out on all sub-volumes 300 allocated in the aggregation volume 250 at the same time. Such organization results in a de facto consistency group for all sub-volumes 300 associated with a particular aggregation volume 250.

To support sub-volume 300, a volume management application 160 called by storage controller 200 in storage system 132 may logically divide the aggregation volume 250 into predefined sized chunks 252. Each chunk 252 may subsequently be allocated to a particular sub-volume 300. In an implementation, each aggregation volume 250 is divided into similar sized and similar quantity chunks 252. For example, each aggregation volume 250 may be the same size and is logically divided into chunks 252 of the same size. In a particular storage system 132, each aggregation volume 250 is logically divided into one gigabyte chunks 252.

In order to enable the creation of sub volumes 300, a volume must be initially created and defined as an aggregated volume 250. In an embodiment, to create and define an aggregation volume 250, a user-command is received by the volume management application 160 called by storage controller 200 and the volume management application 160 resultantly creates a volume and assigns the volume as an aggregation volume 250. In a particular storage system 132, an exemplary received command is, "vol_create vol=vm1_vol pool=vms_pool size=17 aggregated=yes," which creates a volume named vm1_vol, located in volume pool vms_pool, having a size of 17 chunks, and is flagged as an aggregated volume.

As depicted in FIG. 4, a sub-volume 300 may be created by allocating one or more chucks 252 to the sub-volume 300. For example, six chunks 252 are allocated to sub-volume 300A, two chunks 252 are allocated to sub-volume 300B, and three chunks 252 are allocated to sub-volume 300C. When a sub-volume 300 is formed, a size of the sub-volume 300 is provided the volume management application 160 called by storage controller 200. The volume management application 160 may obtain the size of the sub-volume 300 by receiving a user-command which includes the sub-volume 300 requested size.

The sub-volume 300 is subsequently created by allocating the appropriate number of chunks 252 that best fit the sub-volume 300 requested size. The term "allocated" or the like in the context or forming or creating a sub-volume 300 means that particular chunks 252 are assigned, mapped, allotted, or the like, to the sub-volume 300.

In an embodiment, a sub-volume 300 is allocated by the volume management application 160 called by storage controller 200 receiving a user-command that specifies the requested size. The volume management application 160 resultantly allocates the number of chunks 252 to the sub-volume 300. In a particular storage system 132, the received command may be: subvol_create subvol=vm1_config volume=vm1_vol size=3 which creates a sub-volume named vm1 within aggregation volume vm1_vol, having a size of three chunks.

In some embodiments, subsequent to the creation of a sub-volume 300 within an aggregation volume 250, the created sub-volume 300 is bound to generate a sub-volume 300 address that enables computer 100 to interact with that sub-volume 300. In an embodiment, the sub-volume 300 is bound by the volume management application 160 called by storage controller 200 receiving a bind user-command. The volume management application 160 resultantly binds the sub-volume 300 to the aggregation volume 250. In a particular storage system 132, the received command may be: alu_bind alu=alu1 subvol=vm1_config, which binds the sub-volume vm1.

Sub-volumes 300 may be created having an internal offset within its aggregation volume 250. For example, as shown in FIG. 5, sub-volume 300A has no internal offset and begins at the start of the aggregation volume 250, sub-volume 300B has an internal offset of 8 chunks from the start of the aggregation volume 250, and sub-volume 300C has an internal offset of 14 chunks from the start of the aggregation volume 250.

Figure 5:
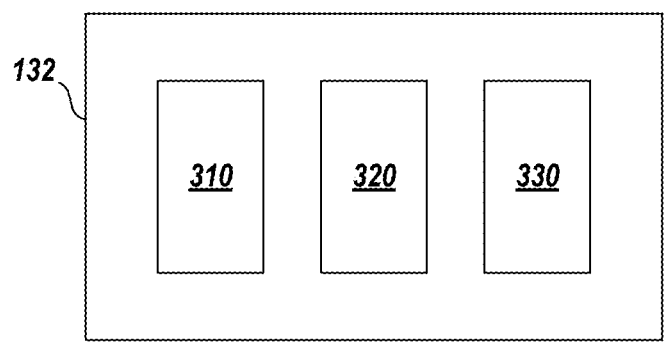
FIG. 5 illustrates exemplary volume management containers that each store data within a storage system, according to various embodiments of the present invention.

FIG. 5 illustrates exemplary volume management containers 310, 320, and 330 that each store one or more data structures that contain sub-volume 300 information, according to various embodiments of the present invention. Volume management containers 310, 320, and 330 are generally storage areas within storage system 132. In a preferred embodiment, volume management containers 310, 320, and 330 are located in storage controller 200. In another embodiment, volume management containers 310, 320, and 330 are located in one or more storage devices 204 whereby the one or more data structures may be called and received by storage controller 200.

Volume management containers 310, 320, and 330 enable storage controller 200 to translate sub-volume addresses to its associated aggregation volume address and determine the sub-volume 300 internal offset within the aggregated volume 250.

Container 310 is a sub-volume segment container and may be referred to as sub-volume segment container 310 and includes one or more data structures that include sub-volume segments which define and locate associated sub-volumes 300 within an aggregation volume 250. Container 320 is a sub-volume meta-data container and may be referred to as sub-volume meta-data container 320 and includes one or more data structures that include sub-volume 300 metadata. Container 330 is a sub-volume snapshot container and may be referred to as sub-volume snapshot container 330 and includes one or more data structures that include sub-volume 300 snapshot metadata.

Figure 6:
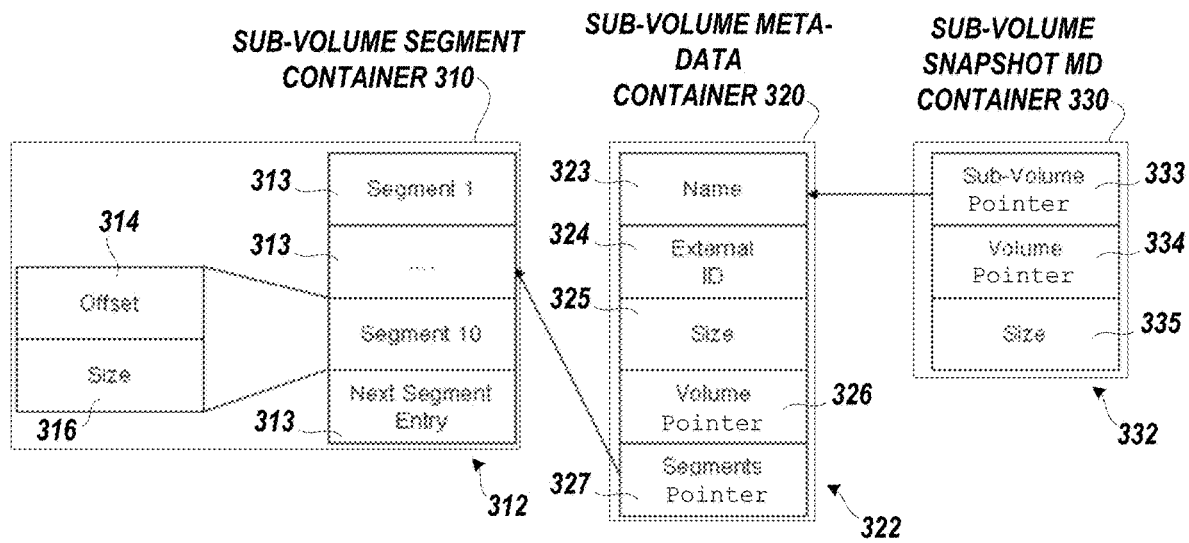
FIG. 6 illustrates exemplary volume management containers that each store data within a storage system, according to various embodiments of the present invention.

FIG. 6 illustrates exemplary volume management containers 310, 320, and 330, according to various embodiments of the present invention.

Sub-volume segment container 310 includes one or more data structure 312 that stores or contains sub-volume 300 segment 313 information. A data structure is a format for organizing and storing data. Exemplary data structures are a list, a file, a record, a table, a map, a tree, a record, or the like.

A sub-volume segment 313 is a data structure that includes an offset value 314 and a size value 316 that identifies, defines, indicates, etc. a particular sub-volume 300. When a sub-volume 300 is allocated, the volume management application 160 called by storage controller 200 writes the sub-volume 300 offset value 314 and sub-volume 300 size value 316 in a volume segment 313 within data structure 312. Each created sub-volume 300, therefore, is associated with a unique or particular sub-volume segment 312. In an embodiment, each aggregation volume 250 is associated with a particular data structure 312. For example, when aggregation volume 250 is allocated, a volume management application 160 called by storage controller 200 creates data structure 312 in sub-volume segment container 310 that is particular to that aggregation volume 250.

Sub-volume meta-data container 320 includes one or more data structures 322 that stores or contains sub-volume 300 metadata information. Sub-volume 300 metadata information may comprise a storage system 132 side sub-volume identifier 323, name, or the like. The storage system 132 side sub-volume identifier 323 is the identifier of the sub-volume 300 on the storage system 132 side of storage controller 200. Sub-volume 300 metadata information may also comprise a computer 100 side sub-volume identifier 324, name, or the like. The computer 100 side sub-volume identifier 324 is the identifier of the sub-volume 300 on the computer 100 side of storage controller 200. The computer 100 or storage system 100 may utilize the data structure 322 which associates the storage system 132 side sub-volume identifier 323 with computer 100 side sub-volume identifier 324 in data handling operations. For example, the computer 100 requests to fetch data at a particular sub-volume 300 and sends such request to storage system 132. The request is received by storage controller 200 and the storage controller 200 utilizes the computer 100 side sub-volume identifier 323 in data structure 322 to determine the associated storage system 132 side sub-volume identifier 324 to determine the particular sub-volume 300 from which to fetch and return data to the computer 100.

Figure 10:
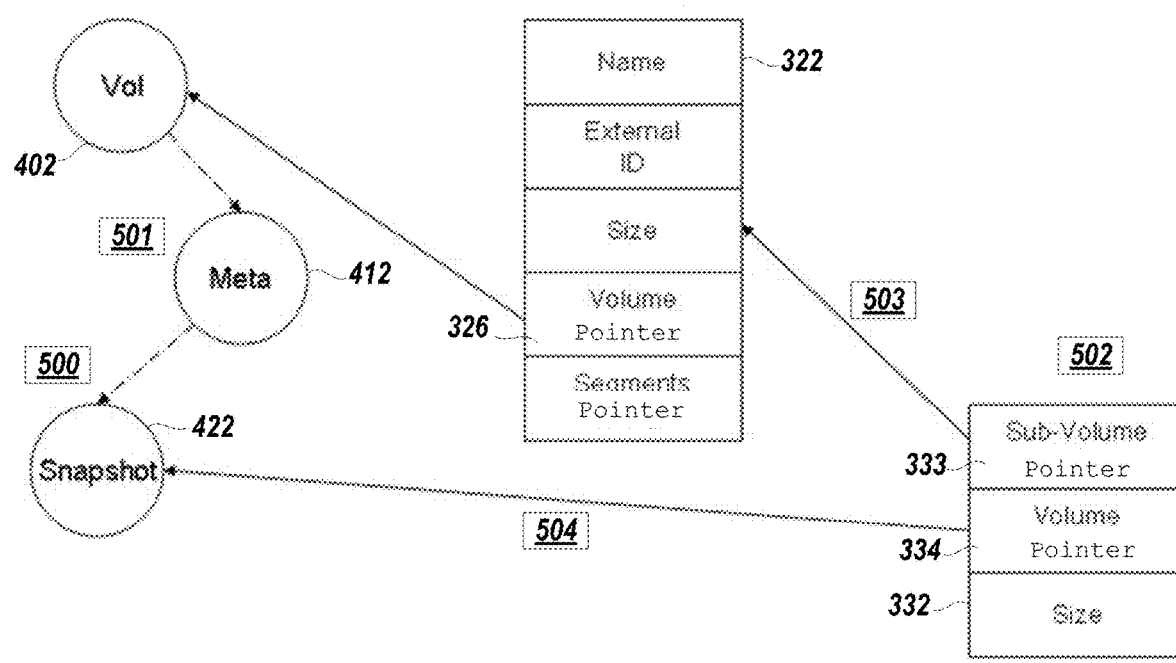
FIG. 10 illustrates an exemplary process of taking a snapshot of a sub-volume within an aggregation volume, according to various embodiments of the present invention.

Sub-volume 300 metadata information may further comprise sub-volume size 325 which indicates the size of the sub-volume 300 associated with the data structure 322. Further, sub-volume 300 metadata information may comprise an aggregation volume pointer 326 and a sub-volume segment pointer 327. The aggregation volume pointer 326 points to a data structure (e.g., data structure 402 shown in FIG. 8, snapshot 422 as shown in FIG. 10) associated with the aggregation volume 250 that contains the sub-volume 300 associated with the data structure 322. The sub-volume segment pointer 327 points to segment 313 within data structure 312 of the sub-volume 300 associated with the data structure 322.

When a sub-volume 300 is allocated, the volume management application 160 called by storage controller 200 creates a data structure 322 in sub-volume meta-data container 320 that is associated therewith. A volume management application 160 may then write sub-volume 300 metadata information into that data structure 322. Each created sub-volume 300, therefore, is associated with a unique or particular data structure 322.

Sub-volume snapshot container 330 includes one or more data structures 332 that include sub-volume 300 snapshot metadata information. Sub-volume 300 snapshot metadata information may include a sub-volume pointer 333. The sub-volume pointer 333 points to the data structure 322 of the sub-volume 300 associated therewith. There may be multiple sub-volume pointers 333 within data structure 332, each sub-volume pointer 333 pointing to a distinct data structure 322.

Sub-volume 300 snapshot metadata information may include an aggregation volume pointer 334. The aggregation volume pointer 334 points to a data structure (e.g., data structure 402 shown in FIG. 8, snapshot 422 as shown in FIG. 10, etc.) associated with the aggregation volume 250 that contains the sub-volume(s) 300 associated with the data structure 332. Sub-volume 300 snapshot metadata information may further comprise sub-volume size 335 which indicates the size of each of the sub-volumes 350 associated with the data structure 332. Sub-volume 300 snapshot metadata information may further include a snapshot pointer (not shown) that points to a snapshot of the aggregation volume 250 associated with the data structure 332. The snapshot may be stored in a snapshot container within the storage system 132. Sub-volume 300 snapshot metadata information may further include a snapshot iteration count (not shown) that counts the number of snapshots taken of the aggregation volume 250 associated with the data structure 332. For example, each instance a snapshot is taken of the aggregation volume 250 associated with the data structure 332, a volume management application 160 called by storage controller 200 increments the snapshot count within data structure 332.

In an embodiment, each aggregation volume 250 is associated with a particular data structure 332. For example, when aggregation volume 250 is allocated, a volume management application 160 called by storage controller 200 creates data structure 332 in sub-volume snapshot container 330 that is particular to that aggregation volume 250. A volume management application 160 called by storage controller 200 may then write sub-volume 300 snapshot metadata information into that data structure 332. Each created aggregation volume 250, therefore, is associated with a unique or particular data structure 332.

Figure 7:
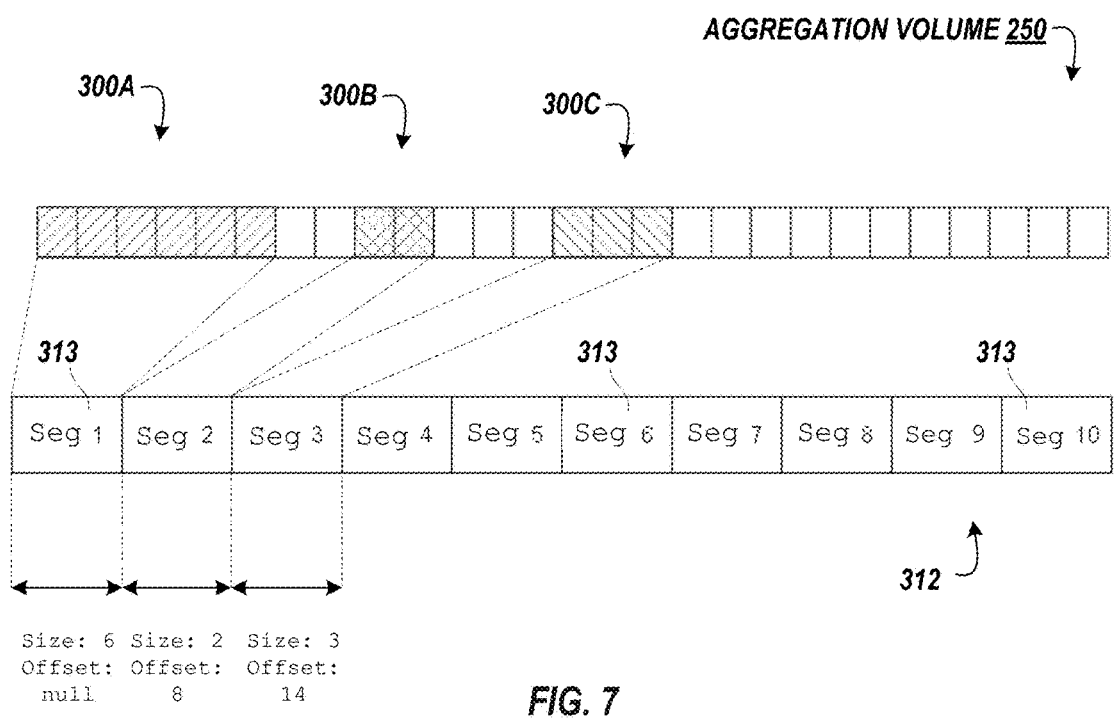
FIG. 7 illustrates an exemplary association of a volume management container and multiple sub-volumes within an aggregation volume, according to various embodiments of the present invention.

FIG. 7 illustrates an exemplary association of a data structure 312 within sub-volume segment container 310 and multiple sub-volumes 300A, 300B, and 300C of an aggregation volume 250, according to various embodiments of the present invention. Each particular aggregation volume 250 is associated with a particular data structure 312 and each sub-volume 300 of that aggregation volume 250 is associated with a particular segment 313 of the data structure 312. For example, the depicted data structure 312 is created and stored within sub-volume segment container 310 and is assigned to the aggregation volume 250 upon the creation of the aggregation volume 250.

Upon the creation of a sub-volume 300 within aggregation volume 250, a segment 313 is written to the data structure 312 and assigned to that sub-volume. For example, when sub-volume 300A, 300B, and 300C are created, segment 1, 2, and 3 are written to data structure 312 and assigned to sub-volume 300A, 300B, and 300C, respectively. As such, segment 1 identifies sub-volume 300A is within aggregation volume 250 and specifies that sub-volume 300A has a size of six chunks 252 and has zero offset. Likewise, segment 2 identifies sub-volume 300B is within aggregation volume 250 and specifies that sub-volume 300B has a size of 2 chunks 252 and has an 8 chunk 252 offset. Similarly, segment 3 identifies sub-volume 300C is within aggregation volume 250 and specifies that sub-volume 300C has a size of 3 chunks 252 and has a 14 chunk 252 offset. In a particular implementation, a predetermined maximum number of sub-volumes 300 may be contained within any particular aggregation volume 250. For example, a particular storage system 132 may allow up to ten sub-volumes 300 within any particular aggregation volume 250. As such, the associated data structure 312 may be created with up to ten segments, as is shown in FIG. 7.

Figure 8:
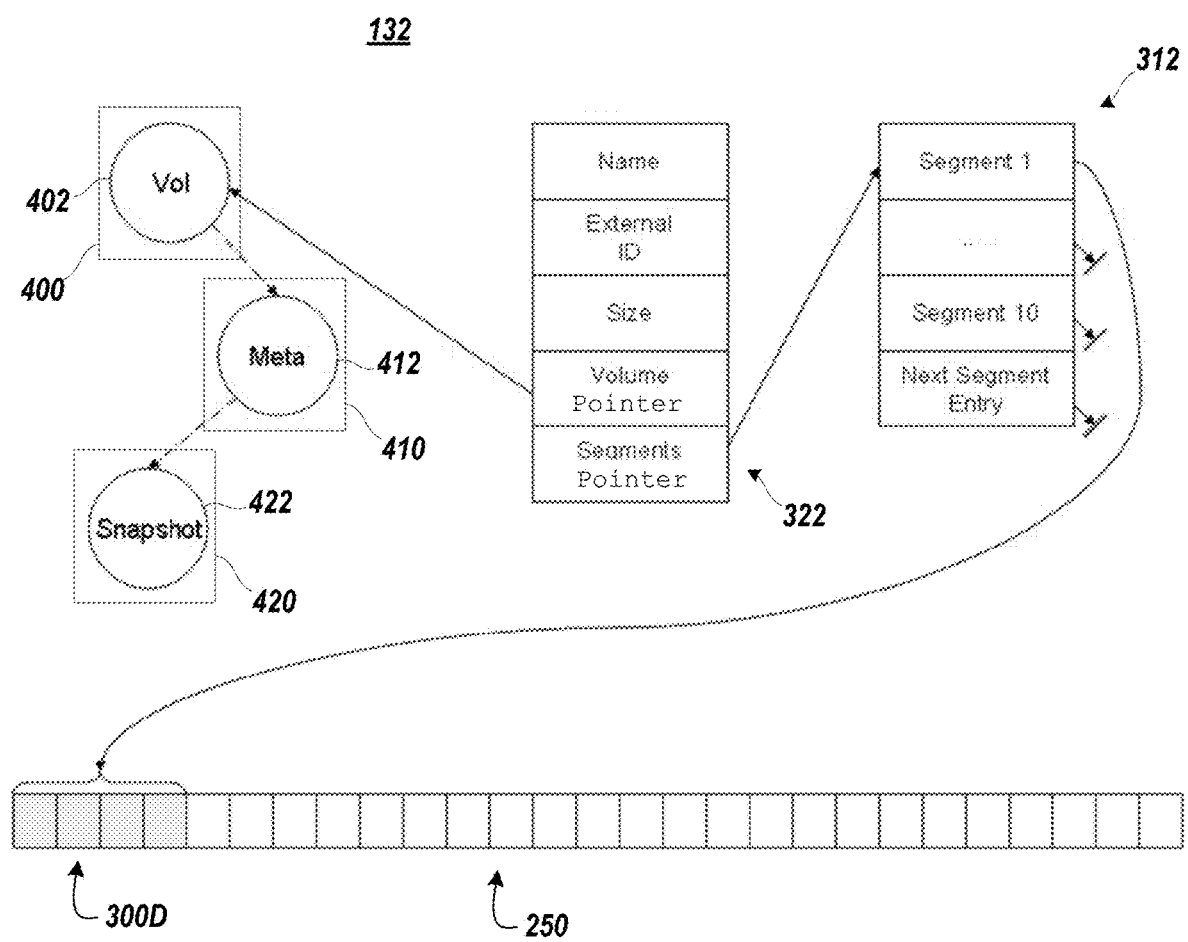
FIG. 8 illustrates an exemplary process of creating a sub-volume within an aggregation volume, according to various embodiments of the present invention.

FIG. 8 illustrates an exemplary process of creating a sub-volume 300D within an aggregation volume 250, according to various embodiments of the present invention. FIG. 8 also depicts volume management containers 400, 410, and 420 that each store one or more data structures that contain aggregation volume 250 information. Volume management containers 400, 410, and 420 are generally storage areas within storage system 132. In a preferred embodiment, volume management containers 400, 410, and 420 are located in storage controller 200. In another embodiment, volume management containers 400, 410, and 420 are located in one or more storage devices 204 whereby the one or more data structures may be called and received by storage controller 200.

Container 400 is an aggregation volume 250 container and may be referred to as aggregation volume container 400 and includes one or more data structures 402 that include aggregation volume information which defines and locates an aggregation volume 250. In some embodiments, the data structure 402 represents an aggregation volume 250. Each aggregation volume 250 may be associated with a particular data structure 402. Container 410 is an aggregation volume 250 meta-data container and may be referred to as aggregation volume 250 meta-data container 410 and includes one or more data structures 412 that include aggregation volume 250 metadata. Each aggregation volume 250 may be associated with a particular data structure 412. Container 420 is an aggregation snapshot 250 container and may be referred to as aggregation volume snapshot container 420 and includes one or more snapshots 422 of the aggregation volume 250. Each aggregation volume 250 may be associated with a particular snapshot 422. The data structures 402, 412, and/or 422 may include pointers that point to another data structure 402, 412, and/or 422.

Creating a sub-volume 300D on an aggregation volume 250 is comprised of the following actions:

A volume management application 160 called by storage controller 200 in storage system 132 finds free chunks 252 of the aggregation volume 250 which can contain the new sub-volume 300D and assigns one or more free chunks 252 as the sub-volume 300D. The number of free chunks 252 assigned being similar to the size of the requested sub-volume 300D. Further, a volume management application 160 called by storage controller 200 in storage system 132 creates a data structure 322 within the sub-volume metadata container 320 associated with the sub-volume 300D. The data structure 322 may point to data structure 402 associated with aggregation volume 250 and may point to the appropriate segment 313 in data structure 312. Further, a volume management application 160 called by storage controller 200 in storage system 132 creates a segment 313 within data structure 312 within the sub-volume segment container 310 associated with the sub-volume 300D.

A free chunk 252 means one or more chunks 252 which has not yet been allocated to a sub-volume 300. In the case of the number of free chunks do not exist, a NOT_ENOUGH_SPACE error code may be returned. The user may then re-size the aggregation volume 250 and retry to create the sub-volume 300. The volume management application 160 may utilize a 'best fit' algorithm in order to efficiently allocate sub-volumes 300 within aggregation volumes 250 and to reduce the total number of free chunks 252 in all aggregation volumes 250 in the storage system 132.

Figure 9:
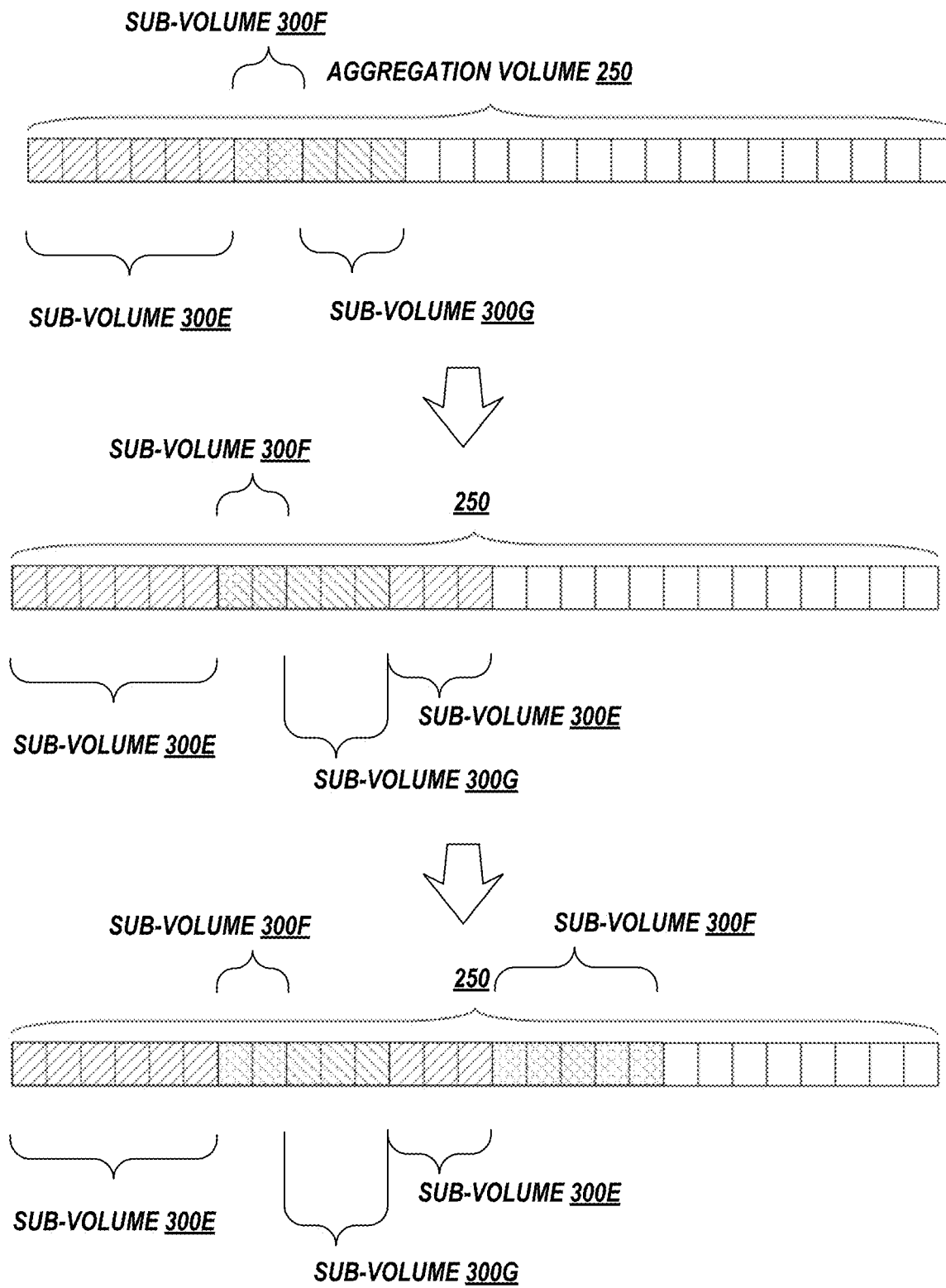
FIG. 9 illustrates an exemplary process of resizing a sub-volume within an aggregation volume, according to various embodiments of the present invention.

FIG. 9 illustrates an exemplary process of resizing sub-volume 300E, 300F, and 300G within an aggregation volume 250. When the size of a sub-volume 300E is reduced, the chunks allocated to the sub-volume 300E does not change. However, the reported size of the sub-volume 300E is reduced. For example, a volume management application 160 called by storage controller 200 in storage system 132 reduces the size 316 value associated with the sub-volume 300E in the appropriate segment 313 associated with sub-volume 300E.

When the size of a sub-volume 300F and 300G is increased additional chunks 250 are allocated according to need or requested increase in size (block 480). For example, additional chunks 250 are allocated to sub-volumes 300E and to sub-volume 300F. In an embodiment, the additional chunks 252 allocated to pre-existing sub-volumes 300F and 300G are only allocated in the same aggregation volume 250 that which contains the pre-existing sub-volumes 300F and 300G.

In order to add size to a pre-existing sub-volume 300, a volume management application 160 called by storage controller 200 in storage system 132 finds free chunks 252 in the aggregation volume 250 that contains the pre-existing sub-volume 300 and assigns one or more free chunks 252 to the pre-exiting sub-volume 300. The number of free chunks 252 added is similar to the size of the requested increase in the pre-existing sub-volume 300 size. Further, a volume management application 160 called by storage controller 200 in storage system 132 adds to the data structure 322 within the sub-volume metadata container 320 associated with the pre-existing sub-volume 300. The data structure 322 may point to data structure 402 associated with aggregation volume 250. The data structure 322 may include two segment pointers 327 to data structure 312, one pointer that points to the pre-existing segment 313 and second pointer pointing to the new segment 313 in data structure 312. Further, a volume management application 160 called by storage controller 200 in storage system 132 creates the new segment 313 within data structure 312 within the sub-volume segment container 310 associated with the added size portion of the pre-existing sub-volume 300. In such implementations, a particular sub-volume 300 may be associated with multiple segments 313.

FIG. 10 illustrates an exemplary process of taking a snapshot of sub-volume 300 within an aggregation volume 250, according to various embodiments of the present invention. A snapshot is generally a copy of the data within an aggregation volume 250 which may be referred to as a copy of the aggregation volume 250. Because one or more sub-volumes 300 are contained within aggregation volume 250, a snapshot of the aggregation volume 250 results in a defacto snapshot of the sub-volumes 300. When this paper refers to a snapshot of a particular sub-volume 300, the term snapshot portion, or the like, may be utilized and refers to a section or portion of the aggregation volume 250 snapshot that is associated with the particular sub-volume 300.

Snapshots are created at the aggregation level but additional support is needed in order to associate a snapshot portion of the snapshot with the applicable sub-volume 300. In order to snap a sub-volume 300, the aggregation volume 250 is first snapped as is known in the art. The snapshot is identified as an aggregation volume snapshot and may be saved in data structure 422 within aggregation volume snapshot container 420 (block 500). The aggregation volume snapshot may be identified as such by setting an aggregation volume indicator as active within data structure 412 in aggregation volume 250 meta-data container 410 (block 501).

A snapshot application 160 called by the storage controller 200 within storage system 132 resultantly creates a new data structure 332 in sub-volume snapshot container 330 (block 502). The created data structure 332 points the pre-existing applicable data structure 322 within sub-volume meta-data container 320 (block 503). The created data structure 332 also points to the snapshot saved in data structure 422 within aggregation volume snapshot container 420 (block 504).

The size of the sub-volume snapshot portion is identified in the created data structure 332 to enable to properly restore the sub-volume snapshot portion in the even of the sub-volume size is altered in the future. The size of the sub-volume snapshot portion may be copied by the snapshot application 160 called by the storage controller 200 within storage system 132 from data structure 322 to data structure 332. Similarly, the size of the sub-volume snapshot portion may be determined by the snapshot application 160 reading data structure 322 and determining the size of the applicable sub-volume 300.

Figure 11:
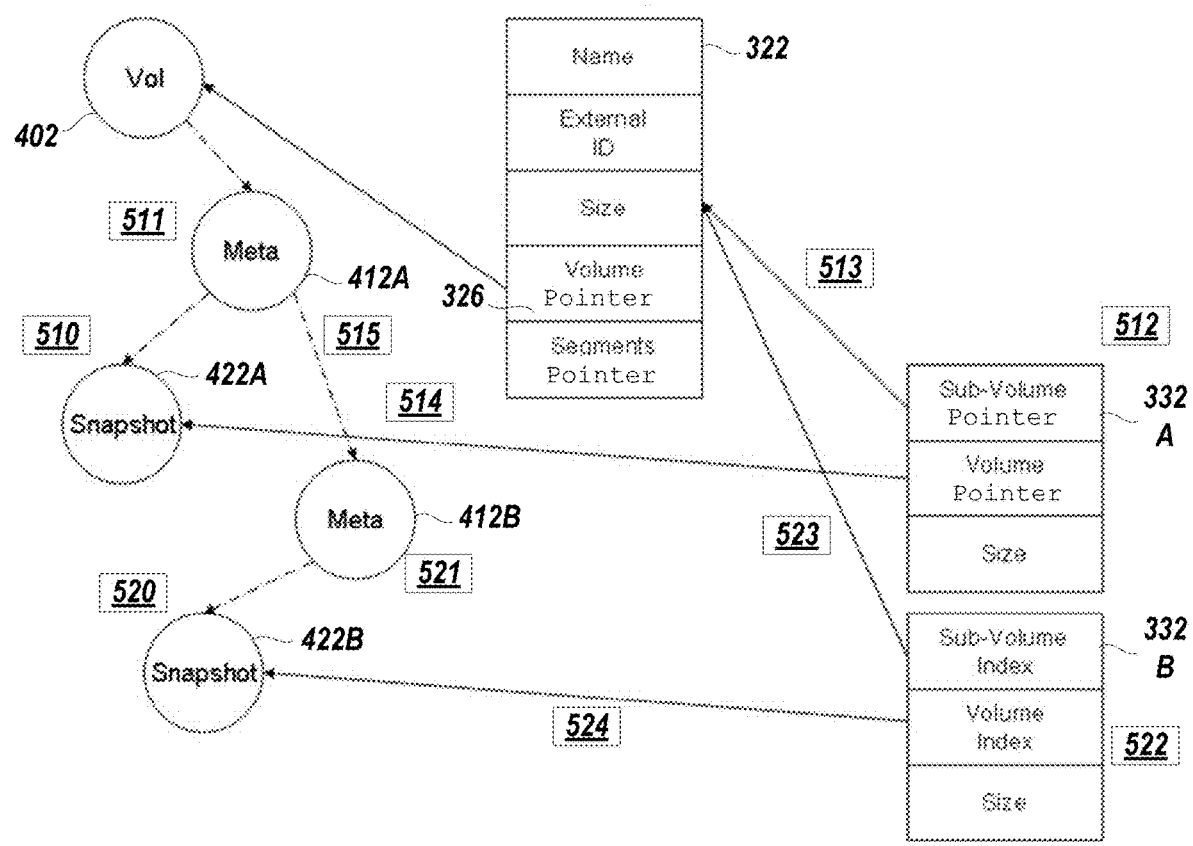
FIG. 11 illustrates an exemplary process of taking multiple snapshots of a sub-volume within an aggregation volume, according to various embodiments of the present invention.

FIG. 11 illustrates an exemplary process of taking multiple snapshots of a sub-volume 300, according to various embodiments of the present invention. In order to take multiple snapshots of a sub-volume 300, the aggregation volume 250 is first snapped as is known in the art. A first snapshot is identified as an aggregation volume snapshot and may be saved in data structure 422A within aggregation volume snapshot container 420 (block 510). The aggregation volume snapshot may be identified as such by setting an aggregation volume indicator as active within data structure 412A in aggregation volume 250 meta-data container 410 (block 511).

A snapshot application 160 called by the storage controller 200 within storage system 132 resultantly creates a new data structure 332A in sub-volume snapshot container 330 (block 512). The created data structure 332A points the pre-existing applicable data structure 322 within sub-volume meta-data container 320 (block 513). The created data structure 332A also points to the snapshot saved in data structure 422A within aggregation volume snapshot container 420 (block 514).

The size of the sub-volume snapshot portion is identified in the created data structure 332A to enable to properly restore the sub-volume snapshot portion in the event of the sub-volume size is altered in the future.

Subsequently, the aggregation volume 250 is again snapped. A second snapshot is identified as an aggregation volume snapshot and may be saved in data structure 422B within aggregation volume snapshot container 420 (block 520). The aggregation volume snapshot may be identified as such by setting an aggregation volume indicator as active within data structure 412B in aggregation volume 250 meta-data container 410 (block 521). A pointer is added to data structure 412A that points to the data structure 412B to link snapshot versions of the applicable aggregation volume 250 (block 515).

A snapshot application 160 called by the storage controller 200 within storage system 132 resultantly creates a new data structure 332B in sub-volume snapshot container 330 (block 522). The created data structure 332B points the pre-existing applicable data structure 322 within sub-volume meta-data container 320 (block 523). The created data structure 332B also points to the snapshot saved in data structure 422 within aggregation volume snapshot container 420 (block 524).

Figure 12:
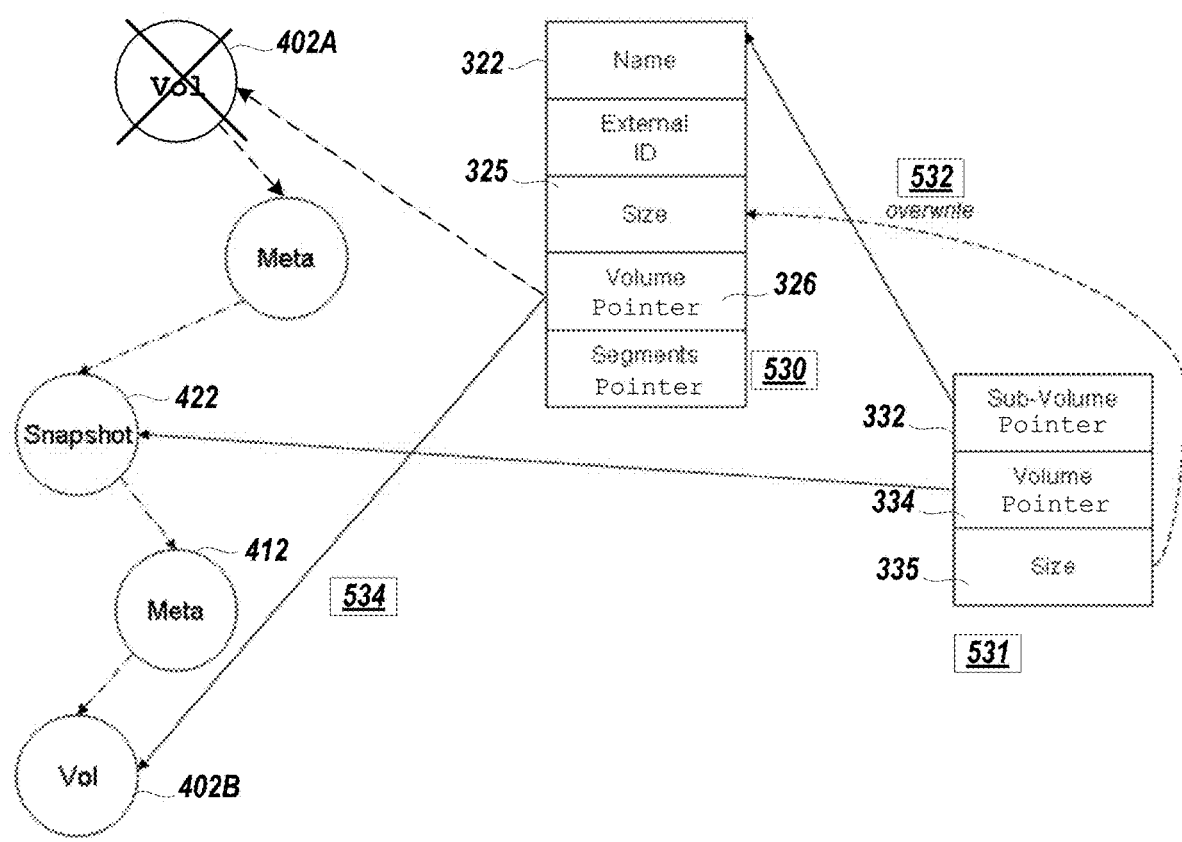
FIG. 12 illustrates an exemplary process of restoring an aggregation volume from a snapshot, according to various embodiments of the present invention.

FIG. 12 illustrates an exemplary process of restoring an aggregation volume 250 from a snapshot, according to various embodiments of the present invention. When restoring an aggregation volume 250 from a snapshot, the aggregation volume 250 is set as an active volume and the following is completed for all relevant sub-volumes 300 within the aggregation volume 250.

The relevant data structure 322 of the sub-volume 300 is located (block 530). The data structure 322 may be located by using the applicable aggregation volume pointer 326 associated with the aggregation volume 250. In certain scenarios, it is possible that there will be several relevant data structures 322.

The relevant data structure 332 of the sub-volume 300 is located (block 531). The data structure 332 may be located by using the applicable aggregation volume pointer 334 associated with the aggregation volume 250. In certain scenarios, it is possible that there will be several relevant data structures 332. Therefore, a volume management application 160 called by storage controller 200 in storage system 132 may verify, before restoring the aggregation volume 250, that none of its sub-volumes 300 are bound.

The size value of sub-volume size 325 is copied or overwritten from the applicable sub-volume size 335 value (block 532). For example, a volume management application 160 called by storage controller 200 in storage system 132 finds the associated value within sub-volume size 335 and write that value to sub-volume size 325.

The volume pointer 326 in the active data structure 322 is set to point to the newly restored aggregation volume 250 (block 534). For example, a volume management application 160 called by storage controller 200 in storage system 132 writes a pointer to volume pointer 326 that points to the newly restored aggregation volume 250 or a data structure (e.g. data structure 402B, or the like) associated with the newly restored aggregation volume 250 which may have previously pointed to the associated deleted aggregation volume data structure 402A.

Figure 13:
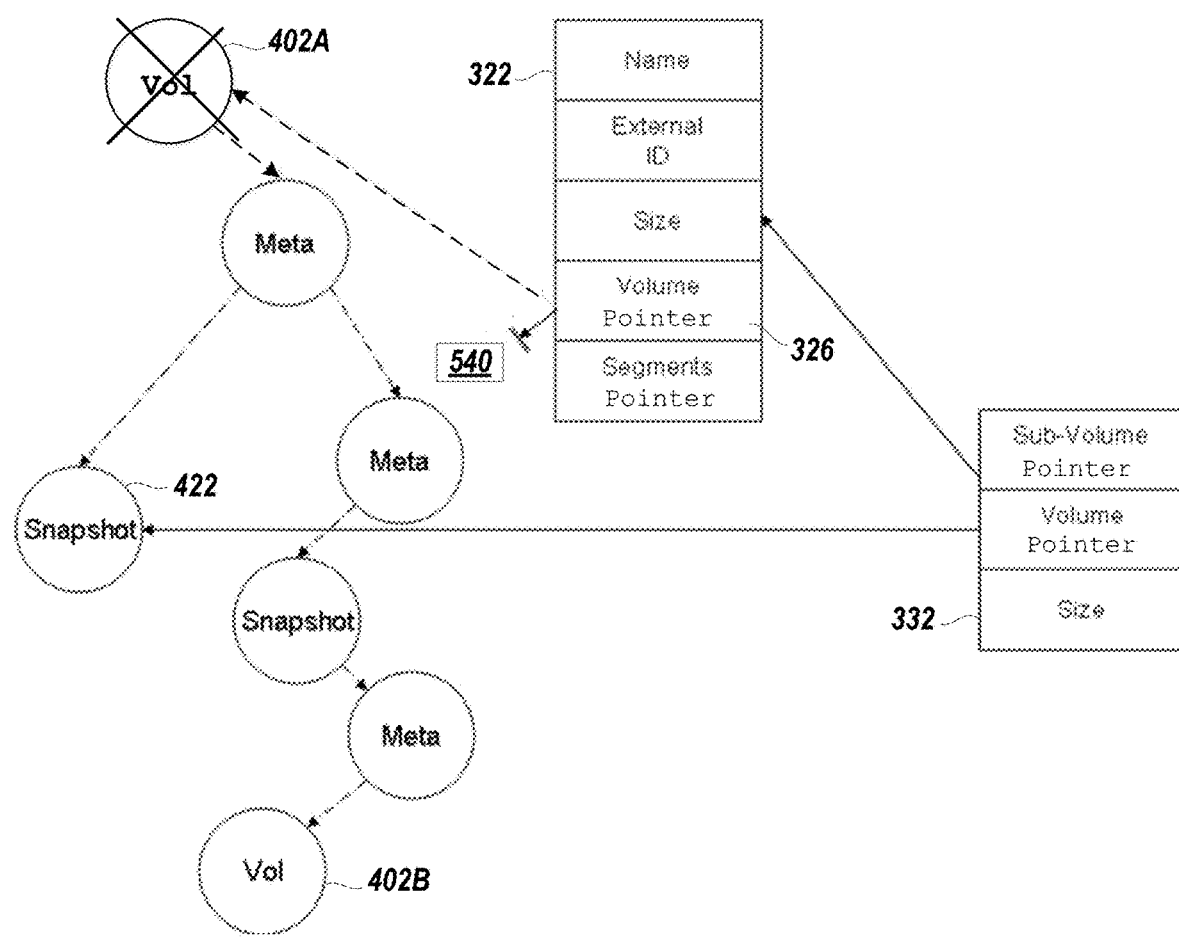
FIG. 13 illustrates an exemplary process of restoring a snapshot and deleting sub-volumes created after the snapshot, according to various embodiments of the present invention.

FIG. 13 illustrates an exemplary process of restoring a snapshot and deleting sub-volumes 300 of that aggregation volume 250 that were created after the snapshot, according to various embodiments of the present invention. When a snapshot is restored, the sub-volumes 300 that were added to the aggregation volume 250 after the snapshot was created appear to be removed by removing the pointer in volume pointer 326 (block 540). For example, a volume management application 160 called by storage controller 200 in storage system 132 removes volume pointer 326 in data structure 322 associated with the sub-volume 300 that was created after the snapshot that is restored.

Figure 14:
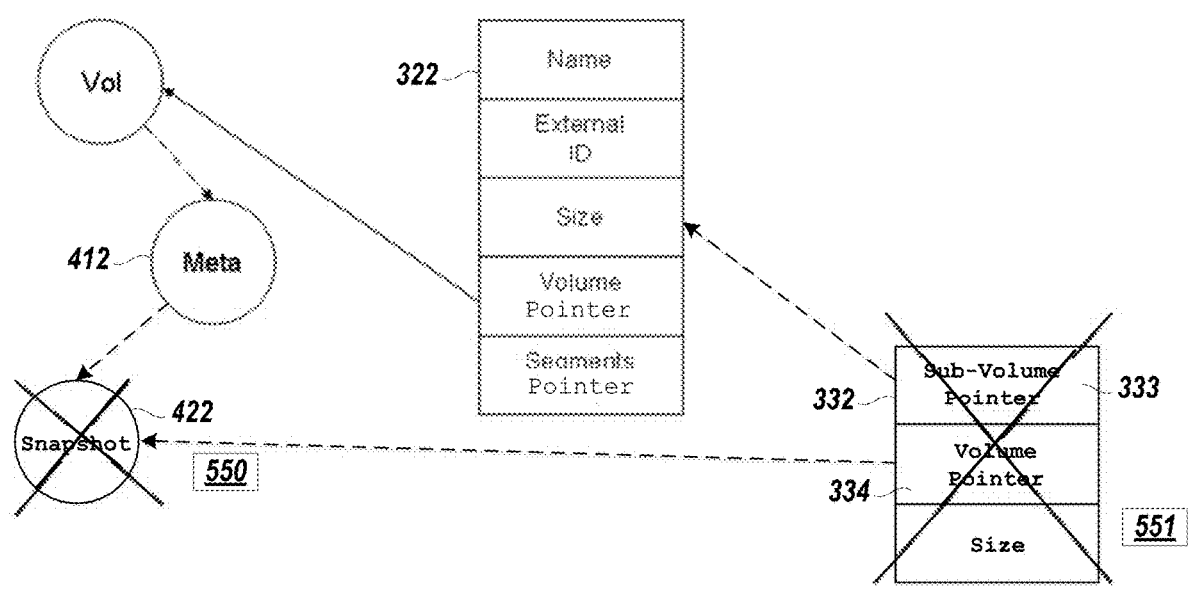
FIG. 14 illustrates an exemplary process of deleting a snapshot of an aggregation volume, according to various embodiments of the present invention.

FIG. 14 illustrates an exemplary process of deleting a snapshot of an aggregation volume 250, according to various embodiments of the present invention. Initially the aggregation volume snapshot is deleted (block 550). For example, a volume management application 160 called by storage controller 200 in storage system 132 deletes data structure 422 in aggregation volume snapshot container 420. Subsequently, all data structures or specific portions of the data structure that point to the deleted snapshot (block 551). For example, a volume management application 160 called by storage controller 200 in storage system 132 deletes structure 332 which includes an aggregation volume pointer 334 which points to the deleted snapshot and may delete the pointer in data structure 412 which points to the deleted snapshot. One or more data structures (e.g. data structure 412) that point to the deleted snapshot 422 may be maintained even though its associated snapshot 422 was deleted.

Figure 15:
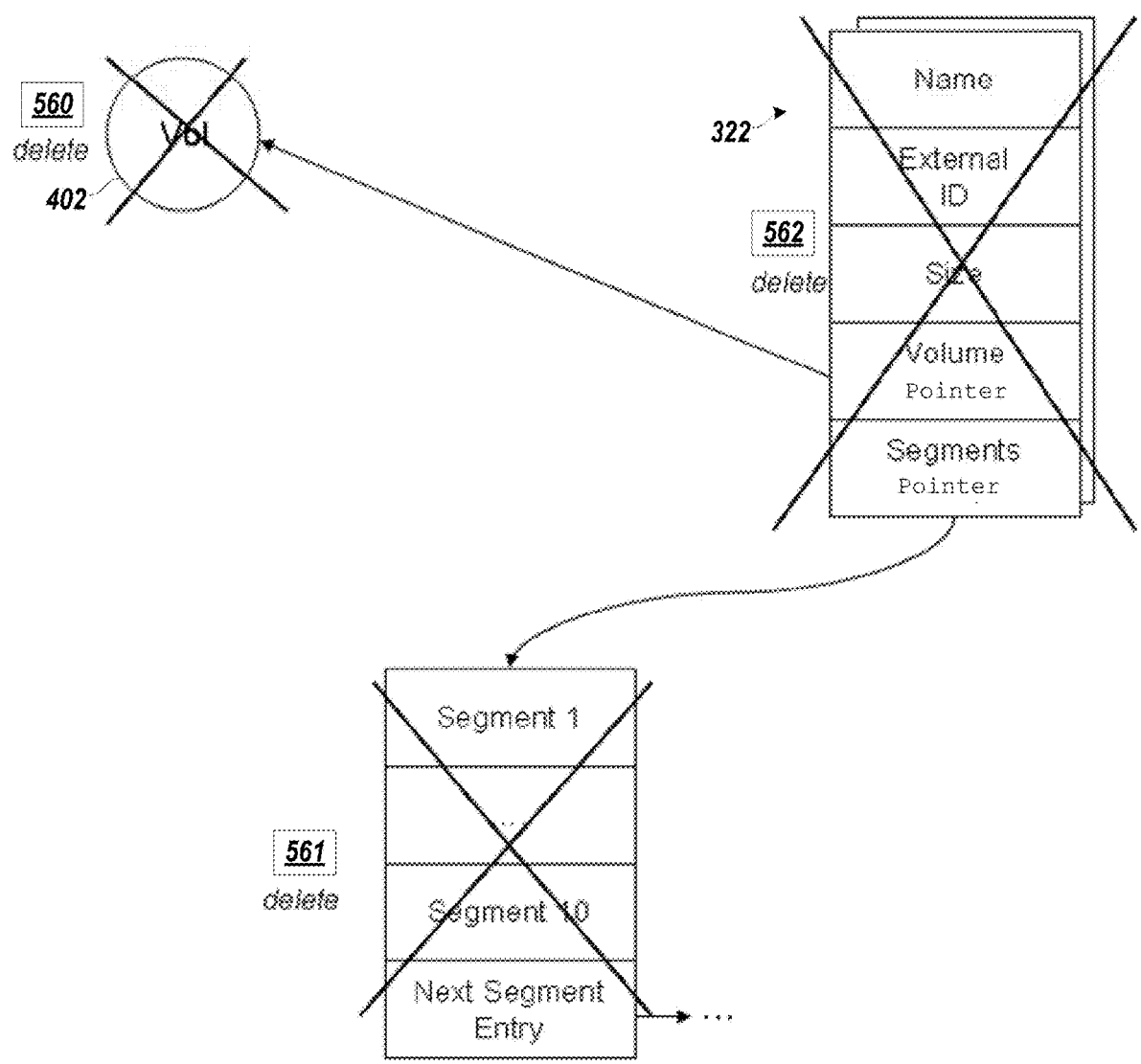
FIG. 15 illustrates an exemplary process of deleting an aggregation volume when no snapshot is associated therewith, according to various embodiments of the present invention.

FIG. 15 illustrates an exemplary process of deleting an aggregation volume when no snapshot is associated therewith, according to various embodiments of the present invention. First, the data structure 402 within the aggregation volume container 400 is deleted (block 560). For example, a volume management application 160 called by storage controller 200 in storage system 132 deletes data structure 402 that is associated with the deleted or to-be deleted aggregation volume 250.

Subsequently, the data structure 312 within sub-volume segment container 310 associated with the sub-volumes 300 of the deleted or to-be deleted aggregation volume 250 is deleted (block 561). For example, a volume management application 160 called by storage controller 200 in storage system 132 deletes data structure 312 that is associated with the deleted or to-be deleted aggregation volume 250.

Subsequently, each of the data structures 322 within sub-volume meta-data container 320 associated with the sub-volumes 300 of the deleted or to-be deleted aggregation volume 250 are deleted (block 562). For example, a volume management application 160 called by storage controller 200 in storage system 132 deletes three data structures 322 that is associated with the deleted or to-be deleted aggregation volume 250 which contains thee sub-volumes 300.

Figure 16:
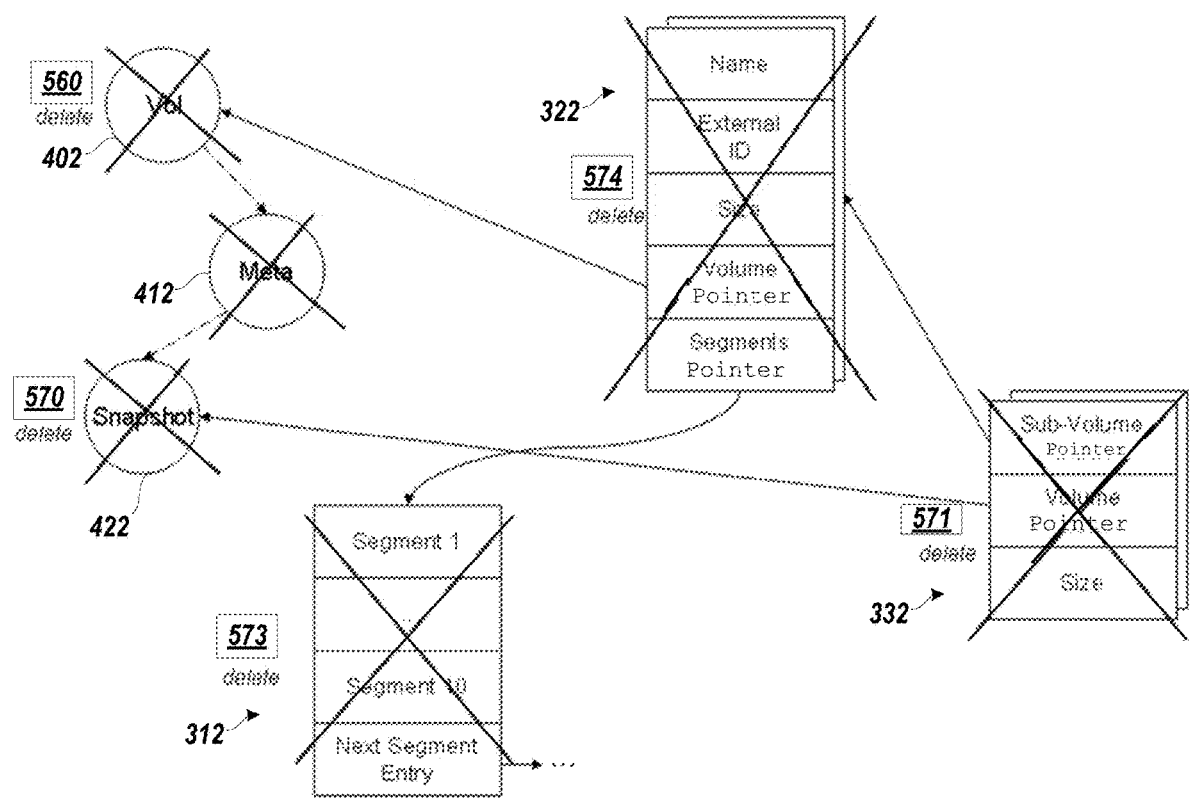
FIG. 16 illustrates an exemplary process of deleting an aggregation volume when a snapshot is associated therewith, according to various embodiments of the present invention.

FIG. 16 illustrates an exemplary process of deleting an aggregation volume when a snapshot is associated therewith, according to various embodiments of the present invention.

First, the snapshot 422 within aggregation volume snapshot container 420 is deleted (block 570). For example, a snapshot application 160 called by storage controller 200 in storage system 132 deletes snapshot 422 that is associated with the deleted or to-be deleted aggregation volume 250.

Subsequently, one or more data structures 332 associated with the sub-volumes included in the deleted or to-be deleted aggregation volume 250 are deleted from sub-volume snapshot container 330 (block 571). For example, volume management application 160 called by storage controller 200 in storage system 132 find the appropriate data structures 332 which point to the deleted snapshot 422 and deletes the found one or more data structures 332.

Subsequently, the data structure 402 within the aggregation volume container 400 is deleted (block 572). For example, a volume management application 160 called by storage controller 200 in storage system 132 deletes data structure 402 that is associated with the deleted or to-be deleted aggregation volume 250.

Subsequently, the data structure 312 within sub-volume segment container 310 associated with the sub-volumes 300 of the deleted or to-be deleted aggregation volume 250 is deleted (block 573). For example, a volume management application 160 called by storage controller 200 in storage system 132 deletes data structure 312 that is associated with the deleted or to-be deleted aggregation volume 250.

Subsequently, each of the data structures 322 within sub-volume meta-data container 320 associated with the sub-volumes 300 of the deleted or to-be deleted aggregation volume 250 are deleted (block 574). For example, a volume management application 160 called by storage controller 200 in storage system 132 deletes three data structures 322 that is associated with the deleted or to-be deleted aggregation volume 250 which contains thee sub-volumes 300.

Figure 17:
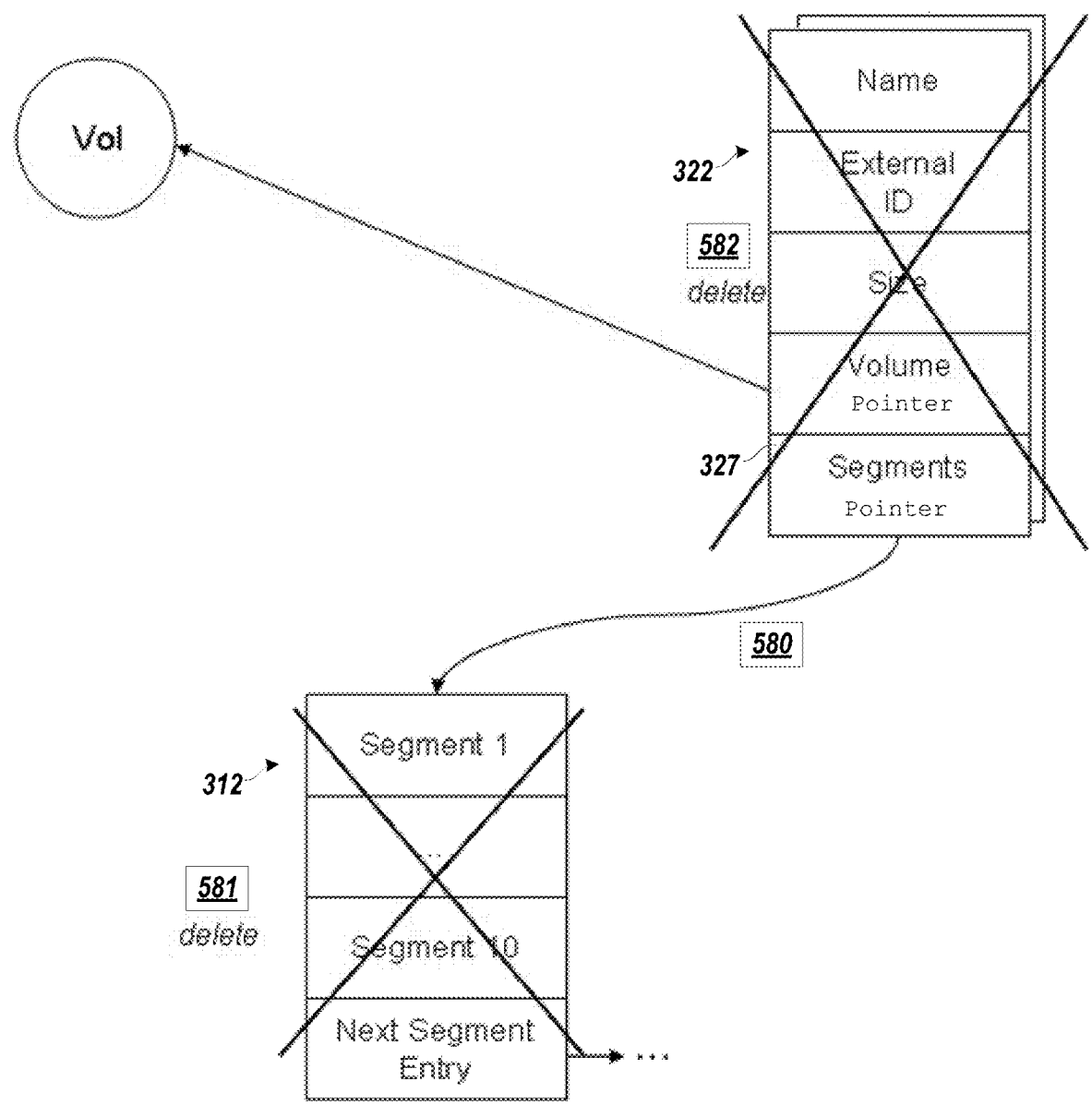
FIG. 17 illustrates an exemplary process of deleting a sub-volume when no snapshot is associated therewith, according to various embodiments of the present invention.

FIG. 17 illustrates an exemplary process of deleting a sub-volume 300 when no snapshot is associated therewith, according to various embodiments of the present invention. First the sub-volume 300 to be deleted is found by searching for data structures associated with the name of the to-be deleted sub-volume. For example, a volume management application 160 called by storage controller 200 in storage system 132 searches for data structures 322 which include the associated sub-volume identifier 323. Once, the applicable data structures 322 are found the associated segments 313 are located within data structure 312 (block 580). For example, a volume management application 160 called by storage controller 200 in storage system 132 finds the associated segments 313 by utilizing segment pointer 327.

Subsequently, the associated segments 313 are deleted from sub-volume segment container 310 (block 581). For example, a volume management application 160 called by storage controller 200 in storage system 132 deletes the found segments 313.

Subsequently, each of the data structures 322 within sub-volume meta-data container 320 associated with the to-be sub-volumes 300 are deleted (block 582). For example, a volume management application 160 called by storage controller 200 in storage system 132 deletes data structures 322 that are associated with the to-be deleted sub-volumes 300.

If the data structures 322 point to a master (i.e., non-snapshot) aggregation volume 250, a volume management application 160 called by storage controller 200 in storage system 132 may un-map the allocated chunks 252 of the aggregation volume 250 according to the to-be deleted sub-volume 300 LBA range.

Figure 18:
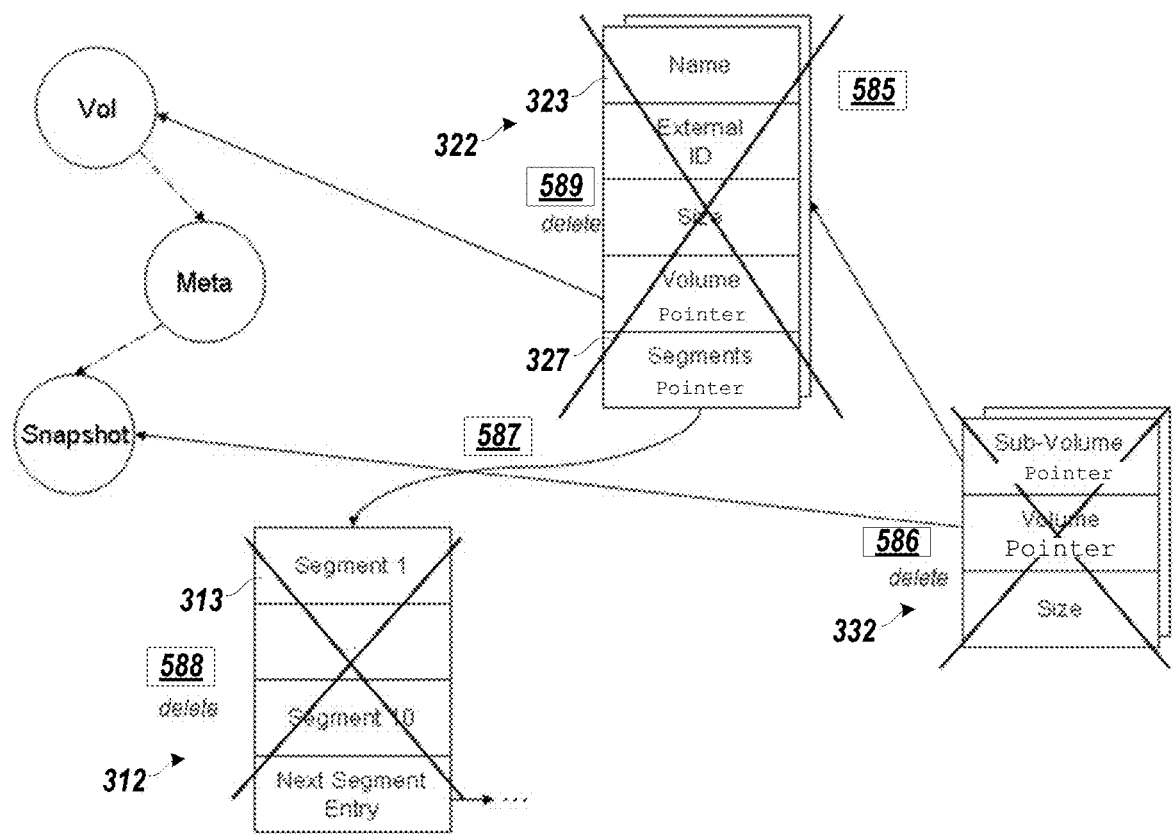
FIG. 18 illustrates an exemplary process of deleting a sub-volume when a snapshot is associated therewith, according to various embodiments of the present invention.

FIG. 18 illustrates an exemplary process of deleting a sub-volume when a snapshot is associated therewith, according to various embodiments of the present invention.

First, the sub-volume 300 to be deleted is found by searching for data structures associated with the name of the to-be deleted sub-volume (block 585). For example, a volume management application 160 called by storage controller 200 in storage system 132 searches for data structures 322 which include the associated sub-volume identifier 323.

Once the applicable data structures 322 are found, one or more data structures 332 associated with the to-be deleted sub-volumes are deleted from sub-volume snapshot container 330 (block 586). For example, volume management application 160 called by storage controller 200 in storage system 132 find the appropriate data structures 332 which point to the deleted snapshot 422 and deletes the found one or more data structures 332.

Subsequently, the associated segments 313 are located within data structure 312 (block 587). For example, a volume management application 160 called by storage controller 200 in storage system 132 finds the associated segments 313 by utilizing segment pointer 327 in each data structure 323. Subsequently, the associated segments 313 are deleted from sub-volume segment container 310 (block 588). For example, a volume management application 160 called by storage controller 200 in storage system 132 deletes the found segments 313.

Subsequently, each of the data structures 322 within sub-volume meta-data container 320 associated with the to-be sub-volumes 300 are deleted (block 589). For example, a volume management application 160 called by storage controller 200 in storage system 132 deletes data structures 322 that are associated with the to-be deleted sub-volumes 300.

If the data structures 322 point to a master (i.e., non-snapshot) aggregation volume 250, a volume management application 160 called by storage controller 200 in storage system 132 may un-map the allocated chunks 252 of the aggregation volume 250 according to the to-be deleted sub-volume 300 LBA range.

Figure 19:
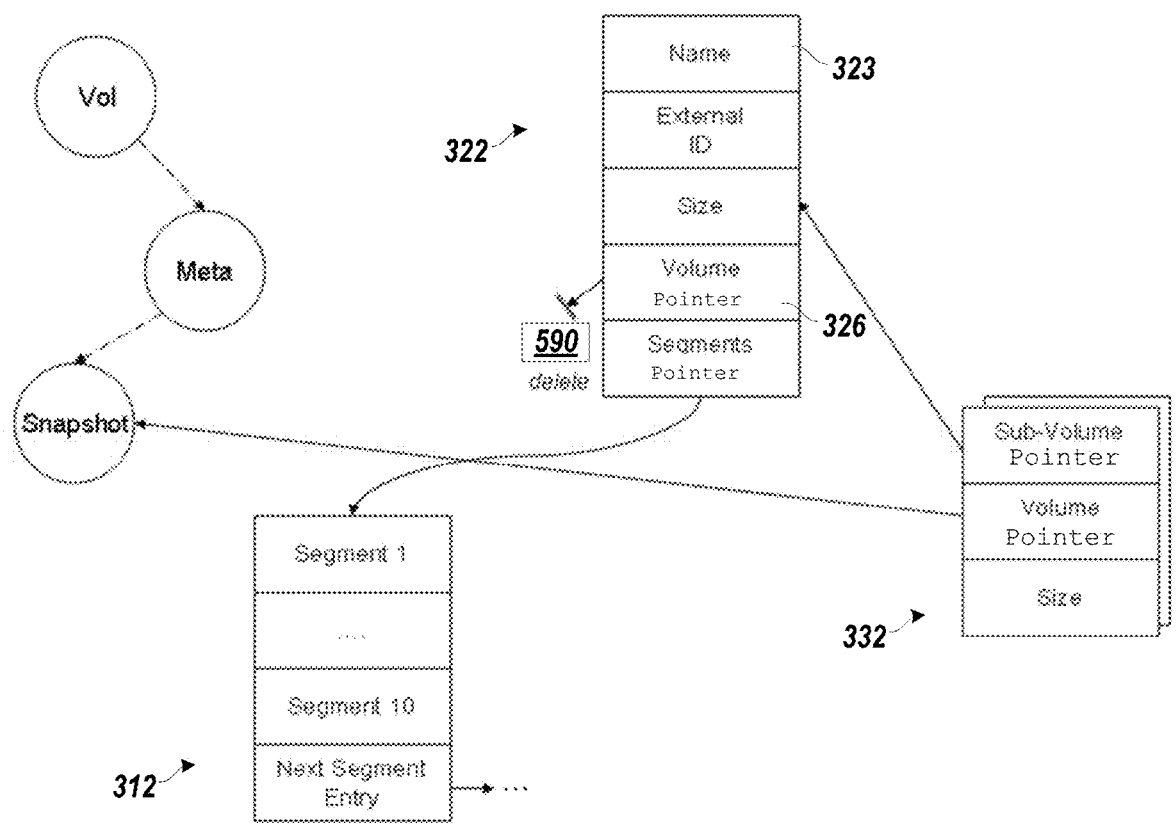
FIG. 19 illustrates an exemplary process of deleting a sub-volume while preserving a snapshot associated therewith, according to various embodiments of the present invention.

FIG. 19 illustrates an exemplary process of deleting a sub-volume 300 while preserving a snapshot associated therewith, according to various embodiments of the present invention.

In some implementations, an aggregation volume 250 represent an entity (e.g. a virtual machine) in which it is beneficial for it to be fully restored when the aggregation volume 250 is restored, even in cases where a sub-volume 300 was deleted after the time the snapshot was taken and before the restore time. In other words, the storage system 132 should be able to retrieve an aggregation volume 250 to a previous state even when at least partially deleted. In such instances, it is desirable to preserve snapshot information.

In these implementations, the data structure 322 is not deleted from the sub-volume meta-data container 320. Rather the aggregation volume pointer 326 that points to the applicable aggregation volume 250 is deleted (block 590). Subsequently, the sub-volume 300 chunks 252 in the applicable aggregation volume 250 are freed (e.g., zeros are written to the chunks 252, or the like).

The sub-volume 300 would still be considered in use (e.g., data structure 323 is present, or the like) but would not be available for new sub-volumes 300 to be added to the applicable aggregation volume 250.

In this implementation, the storage controller 200 may request to preserve the sub-volume 300 snapshots at partial sub-volume 300 deletion (i.e., aggregation volume pointer 326 deletion) and to subsequently fully remove the sub-volume 300 (i.e. entire data structure 322 deletion) once the sub-volumes 300 are no longer required. For example, storage controller 200 may remove the entire data structure 322 once all the sub-volume snapshots are deleted, may remove the entire data structure 322 when the applicable aggregation volume 250 is deleted, or the like.

Figure 20:
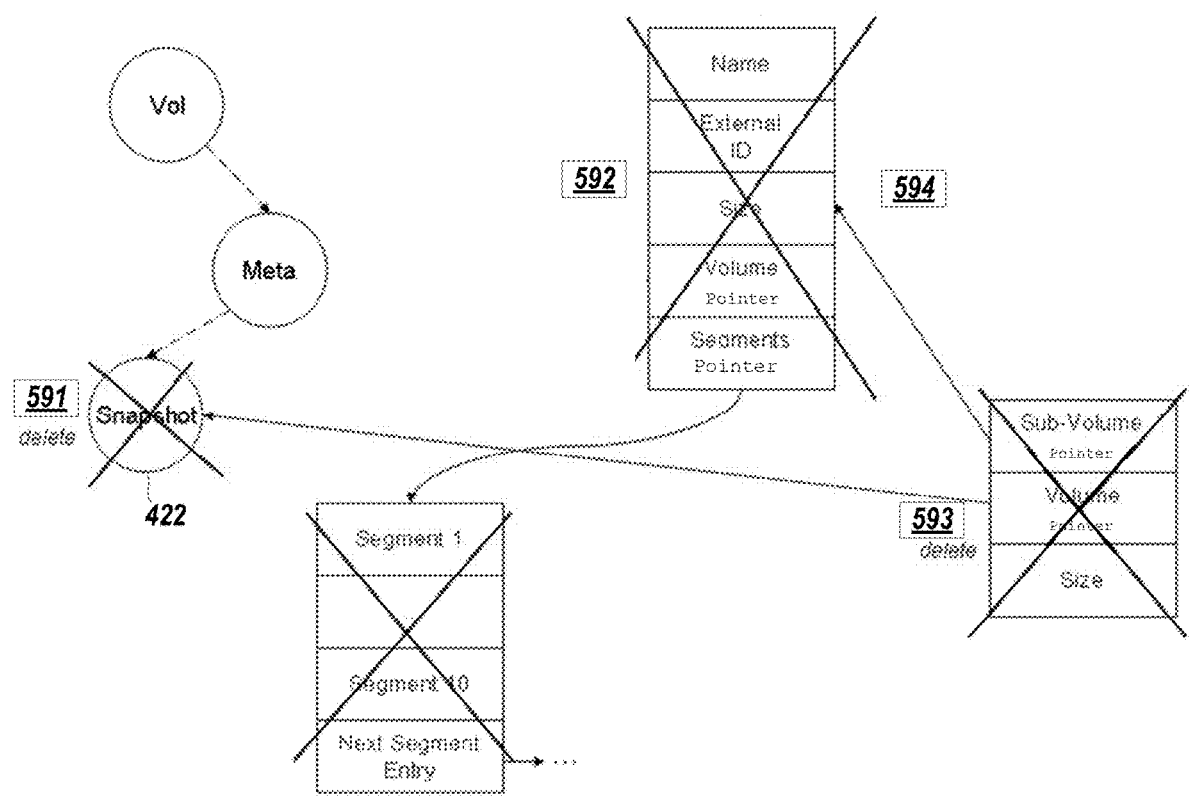
FIG. 20 illustrates an exemplary process of deleting a sub-volume, according to various embodiments of the present invention.

FIG. 20 illustrates an exemplary process of deleting a sub-volume, according to various embodiments of the present invention. Each time a sub volume snapshot 422 is removed (block 591) the associated data structure 332 is deleted (block 593). Subsequently, the storage controller 200 determines if the snapshot 422 is associated with one or more ghost data structures 322 (block 592). A ghost data structure 322 is one in which the data structure 322 is not associated with data structure 332. For example, volume management application 160 called by storage controller 200 in storage system 132 determines that no data structures 332 point to the applicable data structure 322. If it is determined data structure 322 is a ghost data structure 322, the storage controller remove the ghost data structure(s) 332 (block 594).

Figure 21:
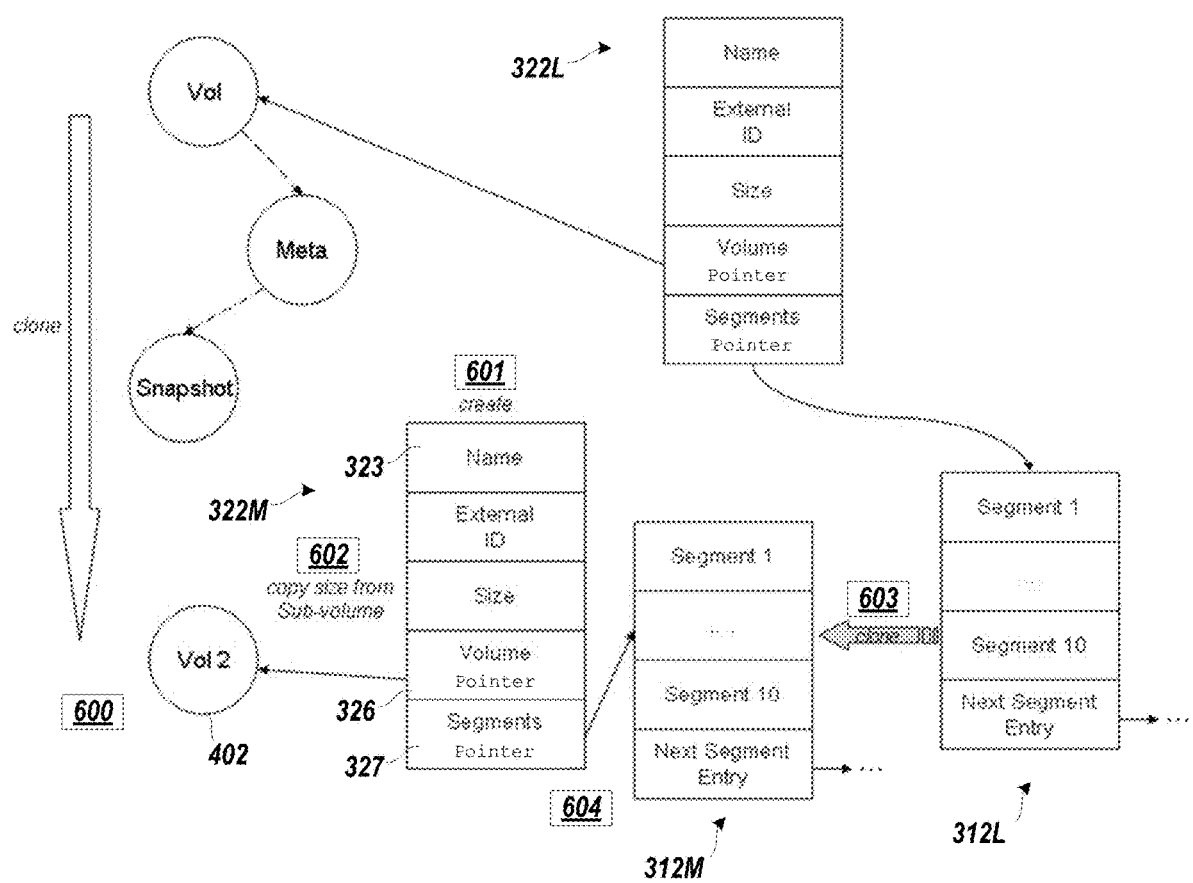
FIG. 21 illustrates an exemplary process of cloning an aggregation volume, according to various embodiments of the present invention.

FIG. 21 illustrates an exemplary process of cloning an aggregation volume, according to various embodiments of the present invention. Another storage operation completed at the aggregation volume 250 level is a clone, or aggregation volume 250 copy. The aggregation volume 250 being copied may be referred to as the source volume and the copy of the aggregation volume 250 may be referred to as the new volume. To make the sub-volumes 300 functional in the new volume, subsequently to creating the new volume (block 600), for each sub-volume 300 that belongs to the source volume, a new data structure 322 is created in sub-volume meta-data container 320 (block 601). For example, volume management application 160 called by storage controller 200 in storage system 132 copies data structure 322L and writes the copy as a new data structure 322M in sub-volume meta-data container 320. In an embodiment, a new identifier 323 may be written to identify the new data structure 322 as a clone data structure associated with the source volume.

Subsequently, the volume pointer 326 in the new data structure 322 is updated to point to the new volume (block 602). For example, volume management application 160 called by storage controller 200 in storage system 132 removes the previous volume pointer 326 that pointed to the source volume and writes a new volume pointer 326 that points to the new volume in data structure 322M.

Subsequently, a new data structure 312 is created in sub-volume segment container 310 (block 603). For example, volume management application 160 called by storage controller 200 in storage system 132 copies data structure 312L and writes the copy as a new data structure 312M in sub-volume segment container 310.

Subsequently, the segment pointer 327 in the new data structure(s) 322 are updated to point to the new data structure 312 (block 604). For example, volume management application 160 called by storage controller 200 in storage system 132 removes the previous segment pointer 327 that pointed to data structure 312L and writes a new segment pointer 327 that points to the new data structure 312M. In an embodiment, sub-volume 300 snapshot data structures 332 are not cloned.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method for managing a snapshot of an aggregation volume within a storage system comprising:
   identifying an aggregation volume in a storage device within the storage system;
   partitioning the aggregation volume into a plurality of equally sized chunks;
   receiving a request at the storage system to create a plurality of sub-volumes, the request comprising a requested sub-volume size for each of the plurality of sub-volumes;
   creating the plurality of sub-volumes within the aggregation volume by allocating a number of chunks most similar to the requested sub-volume size for each of the plurality of sub-volumes;
   storing a sub-volume segment data structure for each of the plurality of sub-volumes within a sub-volume segment container within the storage system, each sub-volume segment data structure comprising a segment entry of the sub-volume, the segment entry comprising a size value that indicates the number of chunks of the aggregation volume that were allocated to an associated sub-volume and an offset value that indicates the number of chunks between the aggregation volume beginning to the associated sub-volume beginning;
   taking a snapshot of the aggregation volume and storing the snapshot within a snapshot container within the storage system;
   identifying each of the sub-volume segment data structures that are associated with each of the plurality of sub-volumes within the aggregation volume; and
   storing a plurality of sub-volume snapshot meta data structures for each of the plurality of sub-volumes within a sub-volume snapshot meta data structure container within the storage system, each sub-volume snapshot meta data structure comprising a snapshot pointer that locates the snapshot of the aggregation volume and a sub-volume segment data structure pointer that locates an associated identified sub-volume segment data structure.

2. The method of claim 1, further comprising:
   storing a sub-volume meta-data data structure within a sub-volume meta-data container within the storage system, the sub-volume meta-data data structure comprising:
   a storage system side sub-volume identifier which the storage system utilizes to identify the sub-volume; and
   a host side sub-volume identifier which a host connected to the storage system utilizes to identify the sub-volume.

3. The method of claim 2, wherein the sub-volume meta-data data structure further comprises:
   an aggregation volume pointer that locates the aggregation volume in which the sub-volume has been created.

4. The method of claim 2, wherein a unique sub-volume meta-data data structure is associated with each unique sub-volume.

5. The method of claim 1, wherein a unique sub-volume segment data structure is associated with each unique aggregation volume.

6. The method of claim 1, wherein the sub-volume meta-data data structure further comprises:
   a segment pointer that locates the segment entry of the sub-volume.

7. The method of claim 1, further comprising:
   receiving a request at the storage system to decrease the sub-volume size; and
   decreasing the size value within the segment entry of the sub-volume.

8. The method of claim 1, further comprising:
   receiving a request at the storage system to increase the sub-volume size; and
   allocating an available additional chunk to the sub-volume.

9. The method of claim 8, wherein the available additional chunk allocated to the sub-volume and the allocated chunks to the sub-volume are located in the same aggregation volume.

10. A computer program product for managing small storage volumes in a storage system, the computer program product comprising a computer readable storage medium having program instructions embodied therewith, the program instructions readable by the storage system to cause the storage system to:
    identify an aggregation volume in a storage device within the storage system;
    partition the aggregation volume into a plurality of equally sized chunks;
    receive a request to create a plurality of sub-volumes within the aggregation volume, the request comprising a requested sub-volume size for each of the plurality of sub-volumes;
    create the plurality of sub-volume by allocating a number of chunks most similar to the requested sub-volume size for each of the plurality of sub-volumes; and
    store a sub-volume segment data structure for each of the plurality of sub-volumes within a sub-volume segment container within the storage system, each sub-volume segment data structure comprising a segment entry of the sub-volume, the segment entry comprising a size value that indicates the number of chunks of the aggregation volume that were allocated to an associated sub-volume and an offset value that indicates the number of chunks between the aggregation volume beginning to the associated sub-volume beginning;
    take a snapshot of the aggregation volume and store the snapshot within a snapshot container within the storage system;
    identify each of the sub-volume segment data structures that are associated with each of the plurality of sub-volumes within the aggregation volume; and
    store a plurality of sub-volume snapshot meta data structures for each of the plurality of sub-volumes within a sub-volume snapshot meta data structure container within the storage system, each sub-volume snapshot meta data structure comprising a snapshot pointer that locates the snapshot of the aggregation volume and a sub-volume segment data structure pointer that locates an associated identified sub-volume segment data structure.

11. The computer program product of claim 10, wherein the program instructions further cause the storage system to:
    store a sub-volume meta-data data structure within a sub-volume meta-data container within the storage system, the sub-volume meta-data data structure comprising:
    a storage system side sub-volume identifier which the storage system utilizes to identify the sub-volume; and a host side sub-volume identifier which a host connected to the storage system utilizes to identify the sub-volume.

12. The computer program product of claim 11, wherein the sub-volume meta-data data structure further comprises:
an aggregation volume pointer that locates the aggregation volume in which the sub-volume has been created.

13. The computer program product of claim 11, wherein a unique sub-volume meta-data data structure is associated with each unique sub-volume.

14. The computer program product of claim 10, wherein a unique sub-volume segment data structure is associated with each unique aggregation volume.

15. The computer program product of claim 11, wherein the sub-volume meta-data data structure further comprises:
a segment pointer that locates the segment entry of the sub-volume.

16. The computer program product of claim 10, wherein the program instructions further cause the storage system to:
receive a request to decrease the sub-volume size; and
decrease the size value within the segment entry of the sub-volume.

17. The method of claim 10, wherein the program instructions further cause the storage system to:
receive a request at the storage system to increase the sub-volume size;
allocate an available additional chunk within the aggregation volume to the sub-volume.

18. A storage system comprising:
a plurality of storage devices and a storage controller between a computer and the plurality of storage devices, the storage controller managing storage operations of data to and from the plurality of storage devices,
wherein the storage controller manages small storage volumes in the storage system, the storage controller comprising program instructions which are readable by the storage system to cause the storage system to:
identify an aggregation volume in a storage device within the storage system;
partition the aggregation volume into a plurality of equally sized chunks;
receive a request to create a plurality of sub-volumes within the aggregation volume, the request comprising a requested sub-volume size for each of the plurality of sub-volumes;
create the plurality of sub-volume by allocating a number of chunks most similar to the requested sub-volume size for each of the plurality of sub-volumes; and
store a sub-volume segment data structure for each of the plurality of sub-volumes within a sub-volume segment container within the storage system, each sub-volume segment data structure comprising a segment entry of the sub-volume, the segment entry comprising a size value that indicates the number of chunks of the aggregation volume that were allocated to an associated sub-volume and an offset value that indicates the number of chunks between the aggregation volume beginning to the associated sub-volume beginning;
take a snapshot of the aggregation volume and store the snapshot within a snapshot container within the storage system;
identify each of the sub-volume segment data structures that are associated with each of the plurality of sub-volumes within the aggregation volume; and
store a plurality of sub-volume snapshot meta data structures for each of the plurality of sub-volumes within a sub-volume snapshot meta data structure container within the storage system, each sub-volume snapshot meta data structure comprising a snapshot pointer that locates the snapshot of the aggregation volume and a sub-volume segment data structure pointer that locates an associated identified sub-volume segment data structure.

19. The storage system of claim 18, wherein the program instructions further cause the storage system to:
store a sub-volume meta-data data structure within a sub-volume meta-data container within the storage system, the sub-volume meta-data data structure comprising:
a storage system side sub-volume identifier which the storage system utilizes to identify the sub-volume; and
a host side sub-volume identifier which a host connected to the storage system utilizes to identify the sub-volume.

20. The storage system of claim 19, wherein the sub-volume meta-data data structure further comprises:
an aggregation volume pointer that locates the aggregation volume in which the sub-volume has been created.

* * * * *